US012785911B2

(12) United States Patent
Hwang et al.

(10) Patent No.: US 12,785,911 B2
(45) Date of Patent: Nov. 3, 2026

(54) METHOD AND APPARATUS FOR TRANSMITTING AND RECEIVING HARQ FEEDBACK IN SHARED SPECTRUM

(71) Applicant: LG Electronics Inc., Seoul (KR)

(72) Inventors: Daesung Hwang, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 18/427,424

(22) Filed: Jan. 30, 2024

(65) Prior Publication Data

US 2024/0260056 A1 Aug. 1, 2024

Related U.S. Application Data

(60) Provisional application No. 63/533,649, filed on Aug. 19, 2023, provisional application No. 63/448,996, (Continued)

(30) Foreign Application Priority Data

Jan. 30, 2023 (KR) ........................ 10-2023-0011949
Feb. 13, 2023 (KR) ........................ 10-2023-0018587
(Continued)

(51) Int. Cl.
*H04L 5/00* (2006.01)
*H04L 1/12* (2006.01)
(Continued)

(52) U.S. Cl.
CPC .............. *H04L 5/0094* (2013.01); *H04L 1/12* (2013.01); *H04L 1/1812* (2013.01); *H04L 1/1819* (2013.01); *H04W 72/25* (2023.01)

(58) Field of Classification Search
CPC ........ H04W 72/25; H04L 1/12; H04L 1/1812; H04L 1/1819; H04L 5/0094
See application file for complete search history.

(56) References Cited

U.S. PATENT DOCUMENTS

2023/0028000 A1 1/2023 Si et al.
2023/0056399 A1* 2/2023 Ji ........................ H04W 12/108
(Continued)

FOREIGN PATENT DOCUMENTS

WO WO 2023/000339 A1 1/2023
WO WO-2024019175 A1 * 1/2024 ............ H04W 72/25
(Continued)

OTHER PUBLICATIONS

S. N. Swain, S. Mishra and C. S. R. Murthy, "A novel spectrum reuse scheme for interference mitigation in a dense overlay D2D network," 2015 IEEE 26th Annual International Symposium on Personal, Indoor, and Mobile Radio Communications (PIMRC), Hong Kong, China, 2015, pp. 1201-1205. (Year: 2015).*
(Continued)

*Primary Examiner* — Joshua Kading
(74) *Attorney, Agent, or Firm* — Fish & Richardson P.C.

(57) ABSTRACT

Provided are a method for performing wireless communication by a first device and an apparatus supporting same. The method may comprise: obtaining information related to a resource block (RB) set for physical sidelink feedback channel (PSFCH) transmission; determining physical resource block (PRB) subsets based on the RB set; receiving a physical sidelink shared channel (PSSCH) from a second device; determining, based on the PRB subsets, a PSFCH resource related to the PSSCH; and performing the PSFCH transmission based on the PSFCH resource.

20 Claims, 19 Drawing Sheets

Related U.S. Application Data filed on Feb. 28, 2023, provisional application No. 63/447,088, filed on Feb. 21, 2023.

(30) Foreign Application Priority Data

| | | |
|---|---|---|
| Feb. 16, 2023 | (KR) | 10-2023-0020523 |
| Mar. 24, 2023 | (KR) | 10-2023-0038814 |
| May 4, 2023 | (KR) | 10-2023-0058530 |
| May 4, 2023 | (KR) | 10-2023-0058534 |
| Jul. 18, 2023 | (KR) | 10-2023-0093259 |
| Sep. 8, 2023 | (KR) | 10-2023-0119697 |

(51) Int. Cl.

*H04L 1/1812* (2023.01)
*H04W 72/25* (2023.01)

(56) References Cited

U.S. PATENT DOCUMENTS

| | | | | |
|---|---|---|---|---|
| 2024/0155582 | A1* | 5/2024 | Ye | H04L 5/0055 |
| 2025/0185048 | A1* | 6/2025 | Wirth | H04L 1/1861 |
| 2025/0254711 | A1* | 8/2025 | Lee | H04L 5/00 |
| 2025/0287401 | A1* | 9/2025 | Liu | H04L 5/0055 |
| 2026/0052513 | A1* | 2/2026 | Lee | H04W 72/02 |

FOREIGN PATENT DOCUMENTS

| | | | | |
|---|---|---|---|---|
| WO | WO-2024128881 A1 * | 6/2024 | | H04W 72/25 |
| WO | WO-2025070836 A1 * | 4/2025 | | H04L 1/1887 |

OTHER PUBLICATIONS

International Search Report and Written Opinion in International Appln. No. PCT/KR2024/001265, mailed on Apr. 29, 2024, 3 pages.
LG Electronics, "Discussion on physical channel design framework for sidelink on unlicensed spectrum," R1-2211264, 3GPP TSG RAN WG1, Meeting #111, Toulouse, France, Nov. 14-18, 2022, 31 pages.
OPPO, "On PHY channel designs and procedures for SL-U," R1-2211451, 3GPP TSG-RAN WG1, Meeting #111, Toulouse, France, Nov. 14-18, 2022, 19 pages.
Vivo, "Physical channel design framework for sidelink on unlicensed spectrum," R1-2211008, 3GPP TSG RAN WG1, Meeting #111, Toulouse, France, Nov. 14-18, 2022, 19 pages.

* cited by examiner

METHOD AND APPARATUS FOR TRANSMITTING AND RECEIVING HARQ FEEDBACK IN SHARED SPECTRUM

CROSS-REFERENCE TO RELATED APPLICATIONS

This application claims the benefit of Korean Patent Application No. 10-2023-0011949 filed on Jan. 30, 2023, Korean Patent Application No. 10-2023-0018587 filed on Feb. 13, 2023, Korean Patent Application No. 10-2023-0020523 filed on Feb. 16, 2023, U.S. Provisional Application No. 63/447,088 filed on Feb. 21, 2023, U.S. Provisional Application No. 63/448,996 filed on Feb. 28, 2023, Korean Patent Application No. 10-2023-0038814 filed on Mar. 24, 2023, Korean Patent Application No. 10-2023-0058534 filed on May 4, 2023, Korean Patent Application No. 10-2023-0058530 filed on May 4, 2023, Korean Patent Application No. 10-2023-0093259 filed on Jul. 18, 2023, U.S. Provisional Application No. 63/533,649 filed on Aug. 19, 2023, and Korean Patent Application No. 10-2023-0119697 filed on Sep. 8, 2023, which are all hereby incorporated by reference herein in their entirety.

TECHNICAL FIELD

This disclosure relates to a wireless communication system.

BACKGROUND ART

5G NR is a successor technology to long term evolution (LTE) and is a new clean-slate mobile communication system with characteristics such as high performance, low latency, high availability, etc. 5G NR may utilize all available spectrum resources, including low-frequency bands below 1 GHz, mid-frequency bands between 1 GHz and 10 GHz, high-frequency (millimeter wave) bands above 24 GHz, etc.

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, (vii) connected intelligence with machine learning capacity, etc. The vision of the 6G system may include four aspects such as intelligent connectivity, deep connectivity, holographic connectivity and ubiquitous connectivity, and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

SUMMARY

In an embodiment, provided is a method for performing wireless communication by a first device. The method may comprise: obtaining information related to a resource block (RB) set for physical sidelink feedback channel (PSFCH) transmission; determining physical resource block (PRB) subsets based on the RB set; receiving a physical sidelink shared channel (PSSCH) from a second device; determining, based on the PRB subsets, a PSFCH resource related to the PSSCH; and performing the PSFCH transmission based on the PSFCH resource. For example, the PRB subsets may be determined by ordering in ascending order of PRB subset index and in ascending order of interlace index.

In an embodiment, provided is a first device adapted to perform wireless communication. The first device may comprise: at least one transceiver; at least one processor; and at least one memory connected to the at least one processor and storing instructions that, based on being executed by the at least one processor, cause the first device to perform operations comprising: obtaining information related to a resource block (RB) set for physical sidelink feedback channel (PSFCH) transmission; determining physical resource block (PRB) subsets based on the RB set; receiving a physical sidelink shared channel (PSSCH) from a second device; determining, based on the PRB subsets, a PSFCH resource related to the PSSCH; and performing the PSFCH transmission based on the PSFCH resource. For example, the PRB subsets may be determined by ordering in ascending order of PRB subset index and in ascending order of interlace index.

In an embodiment, provided is a processing device adapted to control a first device. The processing device may comprise: at least one processor; and at least one memory connected to the at least one processor and storing instructions that, based on being executed by the at least one processor, cause the first device to perform operations comprising: obtaining information related to a resource block (RB) set for physical sidelink feedback channel (PSFCH) transmission; determining physical resource block (PRB) subsets based on the RB set; receiving a physical sidelink shared channel (PSSCH) from a second device; determining, based on the PRB subsets, a PSFCH resource related to the PSSCH; and performing the PSFCH transmission based on the PSFCH resource. For example, the PRB subsets may be determined by ordering in ascending order of PRB subset index and in ascending order of interlace index.

In an embodiment, provided is a non-transitory computer-readable storage medium storing instructions. The instructions, when executed, may cause a first device to perform operations comprising: obtaining information related to a resource block (RB) set for physical sidelink feedback channel (PSFCH) transmission; determining physical resource block (PRB) subsets based on the RB set; receiving a physical sidelink shared channel (PSSCH) from a second device; determining, based on the PRB subsets, a PSFCH resource related to the PSSCH; and performing the PSFCH transmission based on the PSFCH resource. For example, the PRB subsets may be determined by ordering in ascending order of PRB subset index and in ascending order of interlace index.

DETAILED DESCRIPTION

Figure 1:
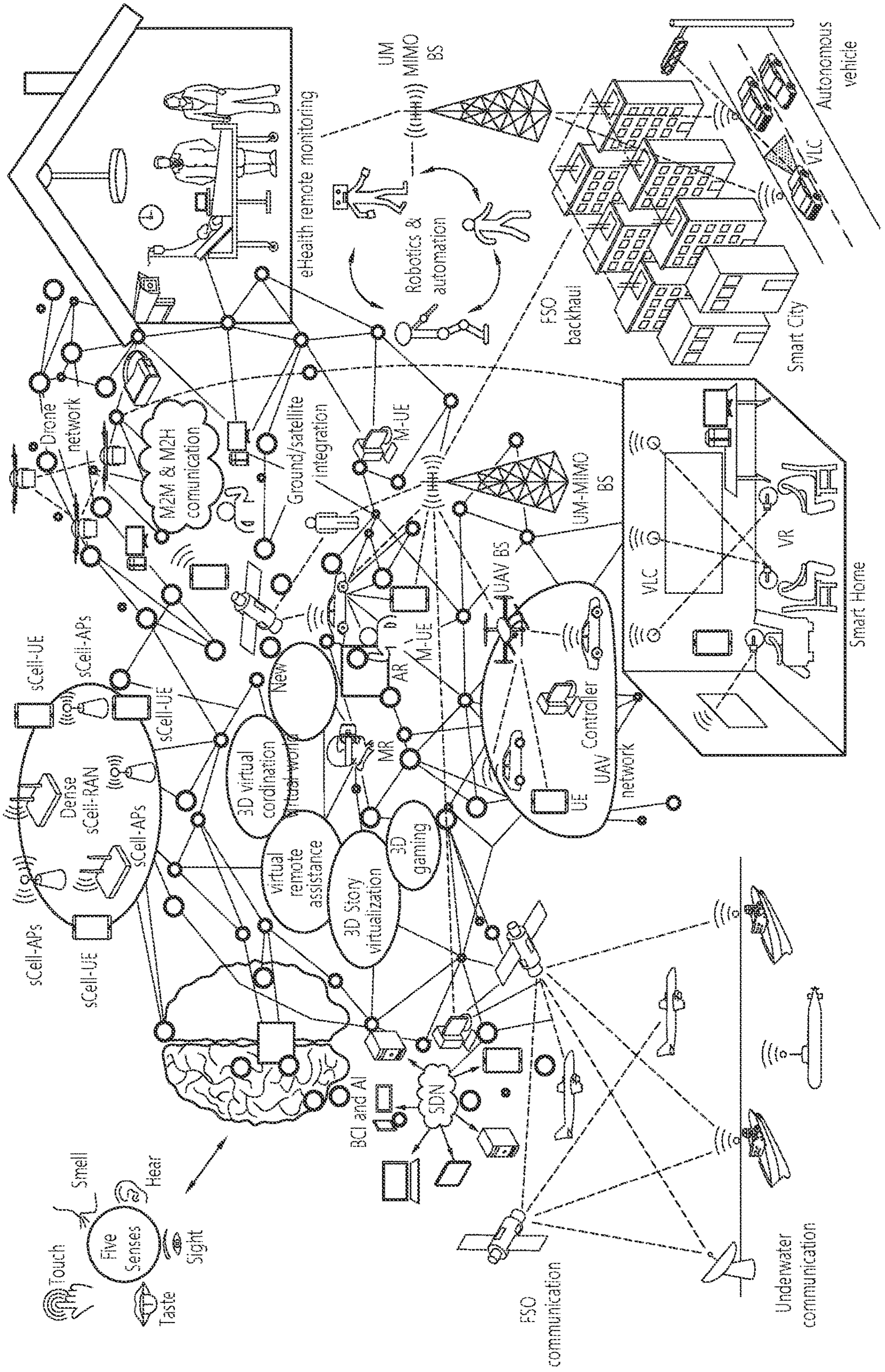
FIG. 1 shows a communication structure providable in a 6G system, based on an embodiment of the present disclosure.

In the present disclosure, "A or B" may mean "only A", "only B" or "both A and B". In other words, in the present disclosure, "A or B" may be interpreted as "A and/or B". For example, in the present disclosure, "A, B or C" may mean "only A", "only B", "only C", or "any combination of A, B and C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one ofA, B and C" may mean "only A", "only B", "only C", or "any combination of A, B and C". In addition, "at least one of A, B or C" or "at least one of A, B and/or C" may mean "at least one of A, B and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

In the present disclosure, "configure/configured or define/defined" may be interpreted as being configured or pre-configured for a device through pre-defined signaling (e.g., SIB, MAC, RRC) from a base station or a network. In the present disclosure, "configure/configured or define/defined" may be interpreted as being pre-configured for a device.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802-20, evolved UTRA (E-UTRA), long term evolution (LTE), 5G NR, and so on.

The technology proposed in the present disclosure may be implemented as 6G wireless technology and may be applied to various 6G systems. For example, the 6G system may have key factors such as enhanced mobile broadband (eMBB), ultra-reliable low latency communications (URLLC), massive machine type communications (mMTC), artificial intelligence (AI) integrated communication, tactile internet, high throughput, high network capacity, high energy efficiency, low backhaul and access network congestion, and enhanced data security.

FIG. 1 shows a communication structure providable in a 6G system, based on an embodiment of the present disclosure. The embodiment of FIG. 1 may be combined with various embodiments of the present disclosure.

In 6G, new network characteristics may be as follows.

Satellites integrated network

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks

Ultra-dense heterogeneous network

High-capacity backhaul

Radar technology integrated with mobile technology: High-precision localization (or location-based service) through communication is one of the functions of the 6G wireless communication system. Accordingly, the radar system will be integrated with the 6G network.

Softwarization and virtualization

Core implementation technology of 6G system is described below.

Artificial Intelligence (AI): When AI is introduced to communication, real-time data transmission may be simplified and improved. AI may determine a method of performing complicated target tasks using countless analysis. That is, AI may increase efficiency and reduce processing delay. Operation consuming time such as handover, network selection, and resource scheduling immediately performed by using AI. AI may also play an important role in M2M, machine-to-human, and human-to-machine. In addition, AI may be a prompt communication in brain computer interface (BCI). An AI based communication system may be supported by metamaterial, intelligence structure, intelligence network, intelligence device, intelligence cognitive radio, self-maintaining wireless network, and machine learning.

Figure 2:
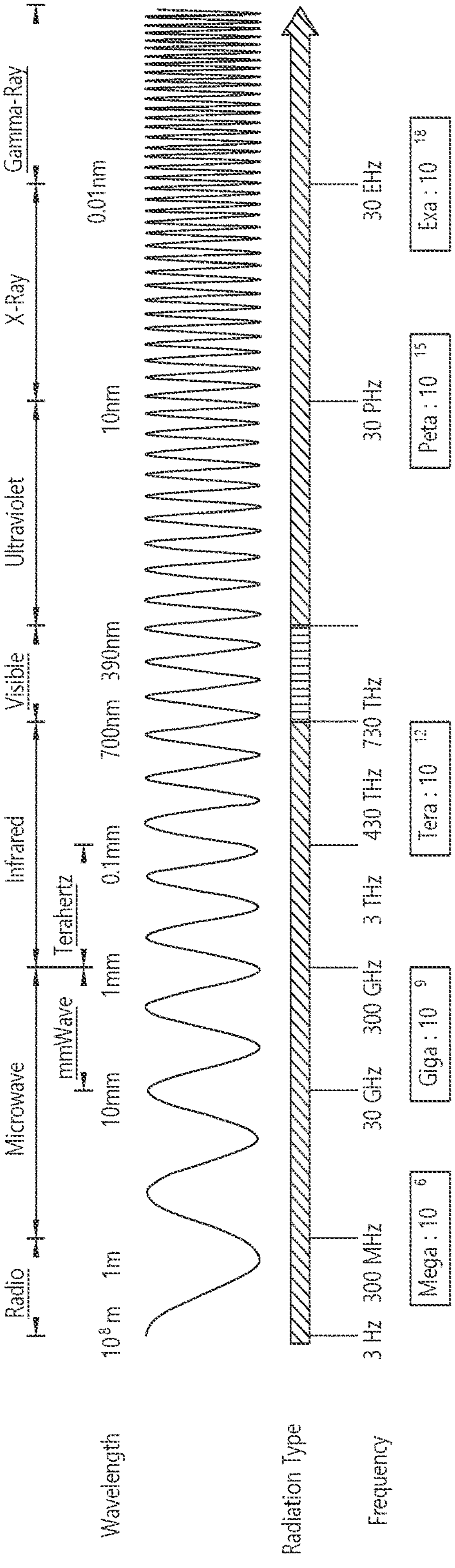
FIG. 2 shows an electromagnetic spectrum, based on an embodiment of the present disclosure.

Terahertz (THz) communication: A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RE FIG. 2 shows an electromagnetic spectrum, based on an embodiment of the present disclosure. The embodiment of FIG. 2 may be combined with various embodiments of the present disclosure. The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Massive MIMO technology (large-scale MIMO)

Hologram beamforming (HBF)

Optical wireless technology

Free space optical (FSO) backhaul network

Quantum communication

Cell-free communication

Integration of wireless information and power transmission

Integration of wireless communication and sensing

Integrated access and backhaul network

Big data analysis

Reconfigurable intelligent surface

Metaverse

Block-chain

Unmanned aerial vehicle (UAV): An UAV or a drone will be an important factor in 6G wireless communication. In most cases, a high-speed data wireless connection may be provided using UAV technology. A base station (BS) entity may be installed in the UAV to provide cellular connectivity. The UAV may have certain features, which are not found in fixed BS infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communication. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Advanced air mobility (AAM): An AAM is a superordinate concept of urban air mobility (UAM), which is air transportation that can be used in an urban area, and may refer to a means of transportation that includes movement between the urban area and a regional hub.

Autonomous driving (self-driving): Vehicle to everything (V2X) that is a core element for establishing an autonomous driving infrastructure may be a technology that vehicle communicates and shares with various elements in road for autonomous driving such as vehicle to vehicle (V2V), vehicle to infrastructure (V2I), and so on. To maximize a performance of autonomous driving and to secure high safety, high transmission speed and low latency technology have to be needed. Furthermore, in the future, autonomous driving may need to go beyond delivering warnings or guidance messages to drivers and actively intervene in vehicle operation and directly control the vehicle in dangerous situations. To this end, since the amount of information that needs to be transmitted and received may be enormous, autonomous driving is expected to be maximized in 6G being higher transmission speed and lower latency than 5G.

Figure 3:
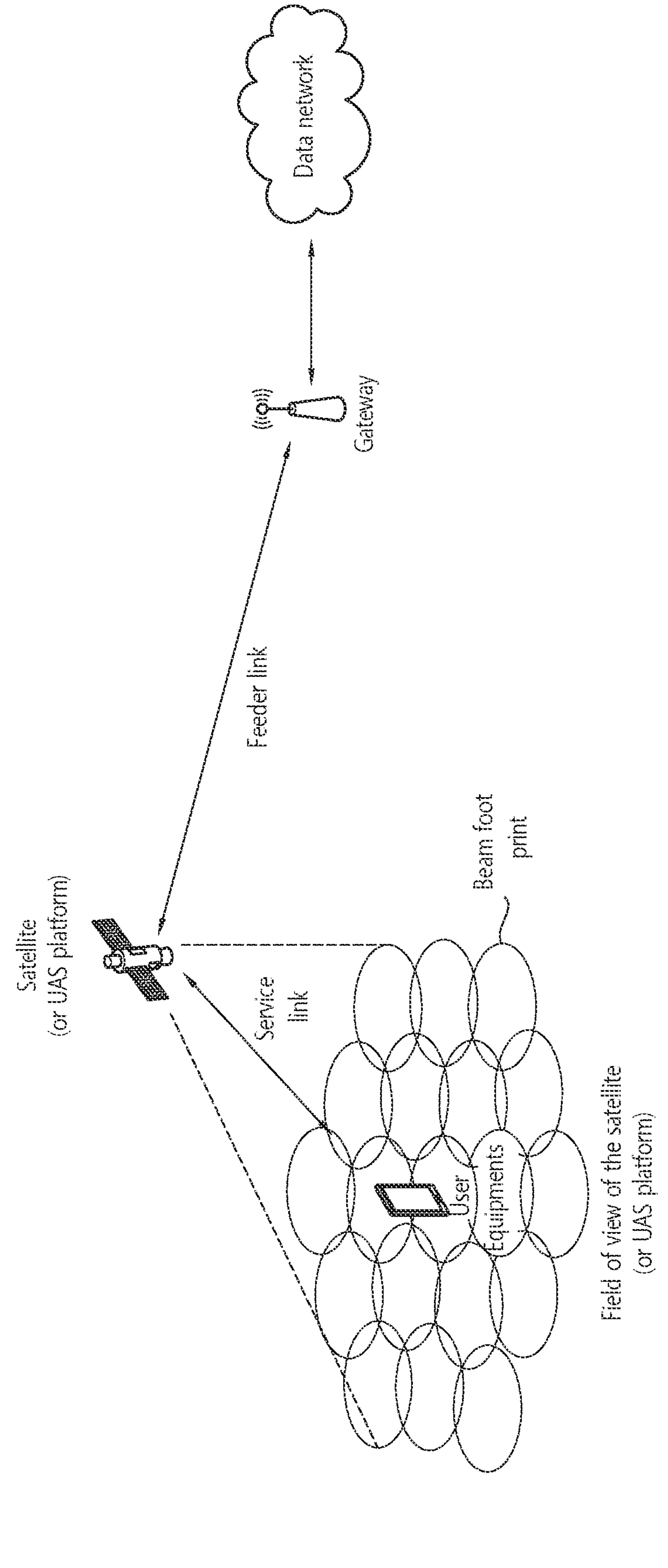
FIG. 3 shows an example of an NTN typical scenario based on a transparent payload, based on an embodiment of the present disclosure.
Figure 4:
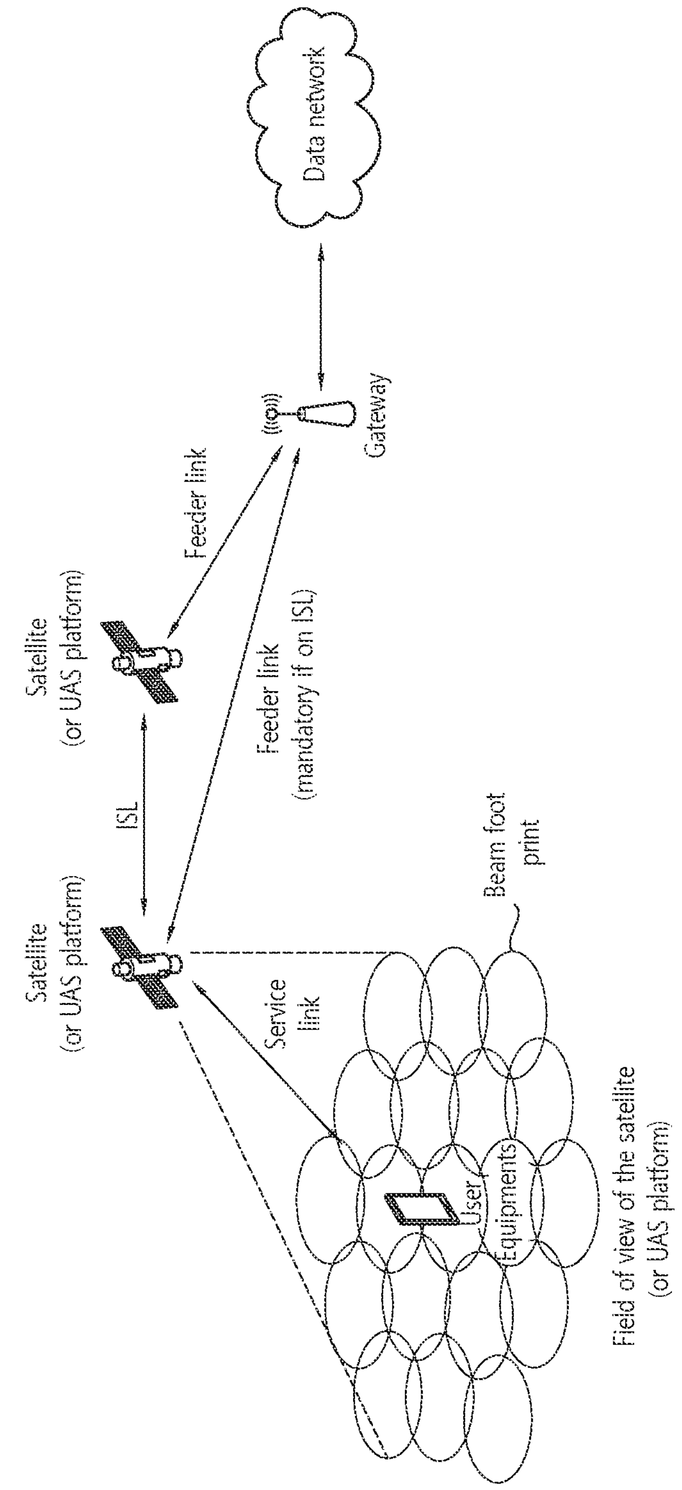
FIG. 4 shows an example of an NTN typical scenario based on a regenerative payload, based on an embodiment of the present disclosure.

Non-terrestrial networks (NTN): An NTN may refer to a network or a network segment that utilizes radio frequency (RF) resources aboard a satellite (or an unmanned aerial system (UAS) platform). FIG. 3 shows an example of an NTN typical scenario based on a transparent payload, based on an embodiment of the present disclosure. FIG. 4 shows an example of an NTN typical scenario based on a regenerative payload, based on an embodiment of the present disclosure. The embodiment of FIG. 3 or FIG. 4 may be combined with various embodiments of the present disclosure. Referring to FIG. 3, a satellite (or an UAS platform) may establish a service link with a UE. The satellite (or the UAS platform) may be connected with a gateway through a feeder link. The satellite may be connected with a data network through the gateway. A beam footprint may refer to an area where signals transmitted by the satellite can be received. Referring to FIG. 4, a satellite (or an UAS platform) may establish a service link with a UE. The satellite (or the UAS platform) connected with the UE may be connected with another satellite (or another UAS platform) through an inter-satellite link (ISL). Another satellite (or another UAS platform) may be connected with a gateway through a feeder link. Based on the regenerative payload, the satellite may be connected with a data network through the gateway and another satellite. If the ISL does not exist between the satellite and another satellite, a feeder link between the satellite and the gateway may be required. FIGS. 3 and 4 are only examples of NTN scenarios, and the NTN can be implemented based on various types of scenarios. For example, the satellite (or the UAS platform) may implement a transparent or regenerative (with on board processing) payload. For example, the satellite (or the UAS platform) may generate multiple beams over a specified service area based on the field of view of the satellite (or the UAS platform). For example, the field of view of the satellite (or the UAS platform) may vary depending on an on-board antenna diagram and a minimum elevation angle. For example, the transparent payload may include radio frequency filtering, frequency conversion, and amplification. Therefore, the waveform signal repeated by the payload may not be changed. For example, the regenerative payload may include radio frequency filtering, frequency conversion and amplification, demodulation/decryption, switching and/or routing, and coding/modulation. For example, the regenerative payload may be substantially equivalent to equipping the satellite (or the UAS platform) with all or part of the base station functionality.

Figure 5:
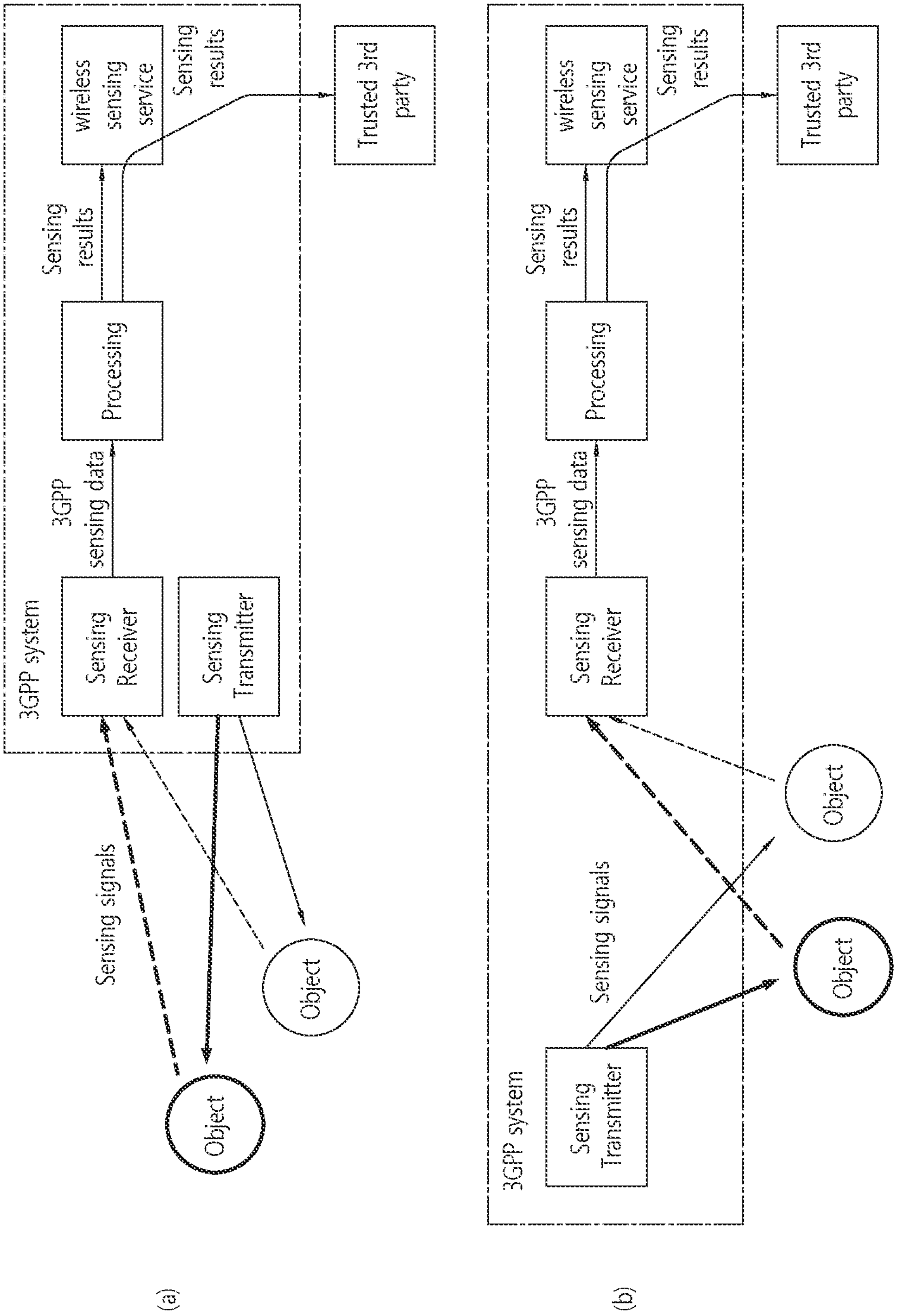
FIG. 5 shows an example of a sensing operation, based on an embodiment of the present disclosure.

Integrated sensing and communication (ISAC): Wireless sensing is a technology enabler to acquire information about characteristics of the environment and/or objects within the environment, that uses radio frequency to determine the distance (range), angle, or instantaneous linear velocity of objects, etc. Radio frequency sensing functionality can provide services for device-free object localization as there is lack of need for the object to be connected via a device in the network. The capabilities to obtain range, velocity, and angle information from the radio frequency signals can provide a broad range of new functionality, such as various objects detection, object recognition (e.g., vehicle, human, animal, UAV) and high accuracy localization, tracking and activity recognition. For example, the wireless sensing service may provide input to different verticals (e.g., unmanned aerial vehicle, smart home, V2X, factories, railways, public safety, etc.) enabling applications offering e.g., intruder detection, assisted automotive maneuvering and navigation, trajectory tracing, collision avoidance, traffic management, health and activity monitoring. In some cases, wireless sensing can also use non-3GPP type sensors (e.g., radar, camera) to further support the 3GPP-based sensing. For example, the operation of the wireless sensing service, i.e., sensing operation, may rely on processing the transmissions, reflections, and scattering of wireless sensing signals. Wireless sensing, therefore, may have the opportunity to enhance the legacy system from a communication network to a wireless communication and sensing network. FIG. 5 shows an example of a sensing operation, based on an embodiment of the present disclosure. The embodiment of FIG. 5 may be combined with various embodiments of the present disclosure. Specifically, (a) of FIG. 5 shows an example of sensing (e.g., monostatic sensing) with co-located sensing receiver and sensing transmitter, and (b) of FIG. 5 shows an example of sensing (e.g., bistatic sensing) with separated sensing receiver and sensing transmitter.

Layers of a radio interface protocol between the UE and the network may be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

A radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 2 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP or an extended CP is used.

TABLE 2

| CP type | SCS (15*2$^u$) | $N^{slot}_{symb}$ | $N^{frame,u}_{slot}$ | $N^{subframe,u}_{slot}$ |
|---|---|---|---|---|
| normal CP | 15 kHz (u = 0) | 14 | 10 | 1 |
| | 30 kHz (u = 1) | 14 | 20 | 2 |
| | 60 kHz (u = 2) | 14 | 40 | 4 |
| | 120 kHz (u = 3) | 14 | 80 | 8 |
| | 240 kHz (u = 4) | 14 | 160 | 16 |
| extended CP | 60 kHz (u = 2) | 12 | 40 | 4 |

Figure 6:
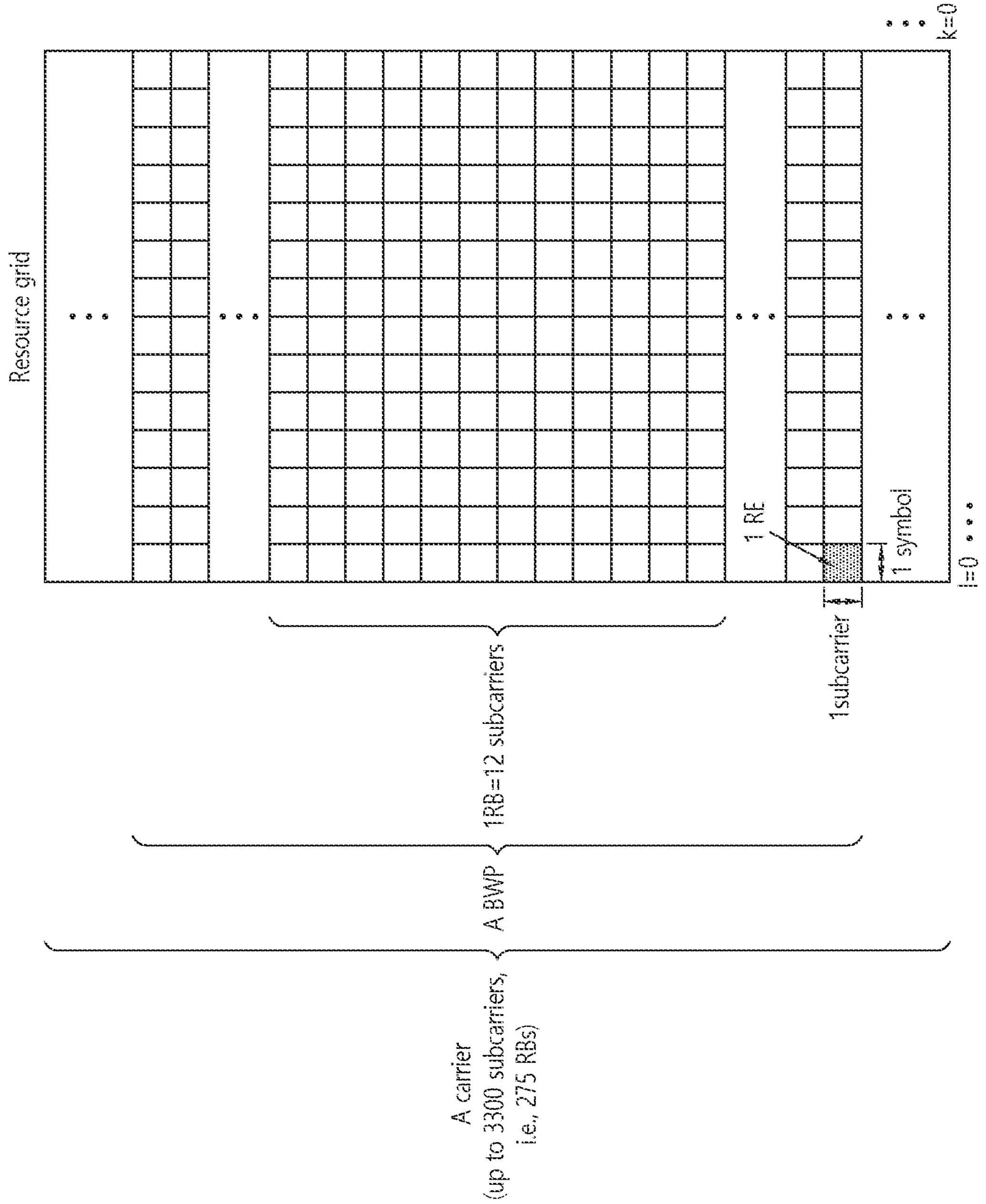
FIG. 6 shows a structure of a slot of a frame, based on an embodiment of the present disclosure.

FIG. 6 shows a structure of a slot of a frame, based on an embodiment of the present disclosure. The embodiment of FIG. 6 may be combined with various embodiments of the present disclosure.

Referring to FIG. 6, a slot includes a plurality of symbols in a time domain. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Figure 7:
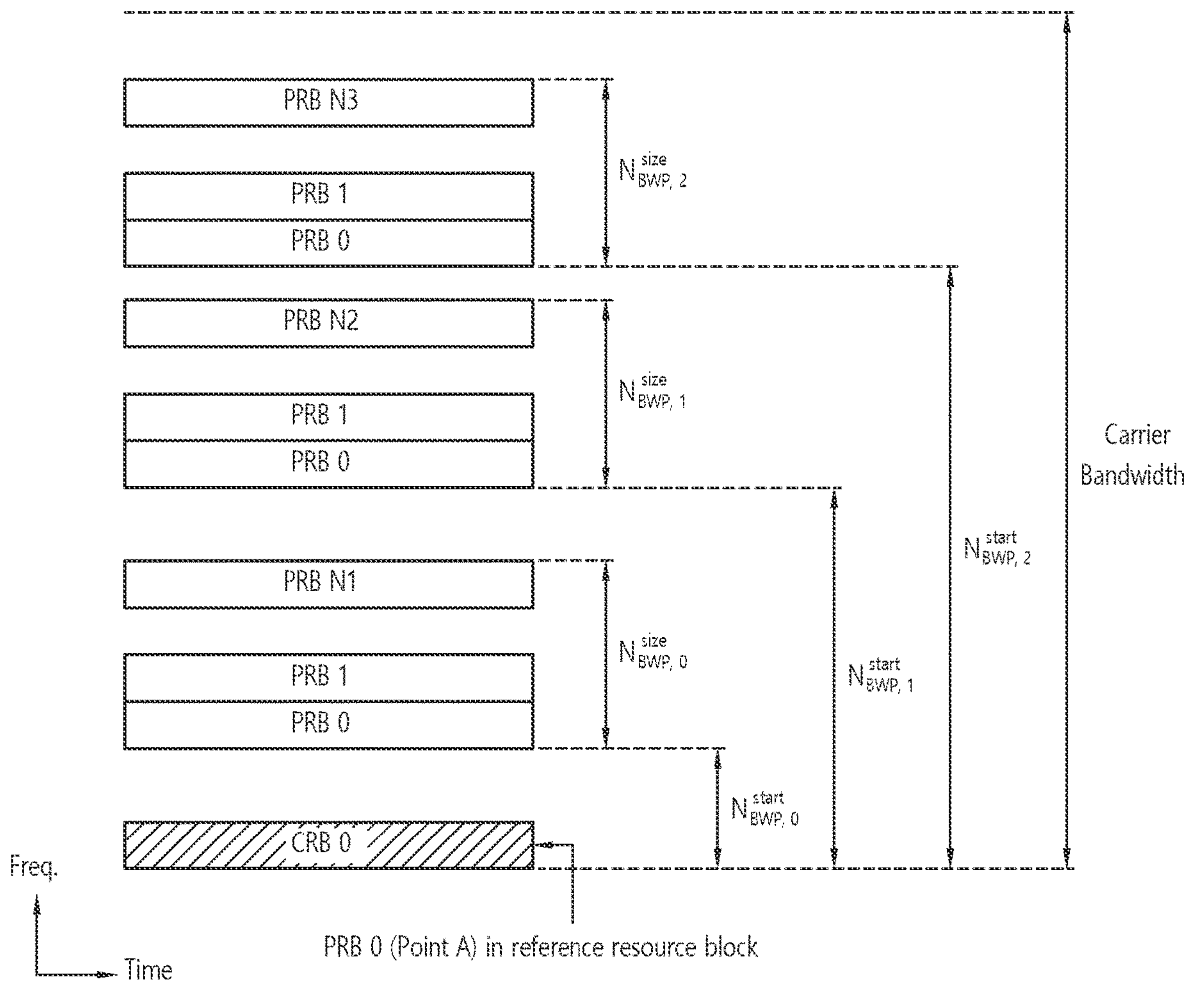
FIG. 7 shows an example of a BWP, based on an embodiment of the present disclosure.

A bandwidth part (BWP) may be a set of consecutive physical resource blocks (PRBs) in a given numerology. The PRB may be selected from consecutive sub-sets of common resource blocks (CRBs) for the given numerology on a given carrier FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

A sidelink synchronization signal (SLSS) may include a primary sidelink synchronization signal (PSSS) and a secondary sidelink synchronization signal (SSSS), as a sidelink (SL)-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

In the present disclosure, a PSCCH may be replaced with a control channel, a physical control channel, a control channel related to sidelink, a physical control channel related to sidelink, etc. In the present disclosure, a PSSCH may be replaced with a shared channel, a physical shared channel, a shared channel related to sidelink, a physical shared channel related to sidelink, etc.

Figure 8:
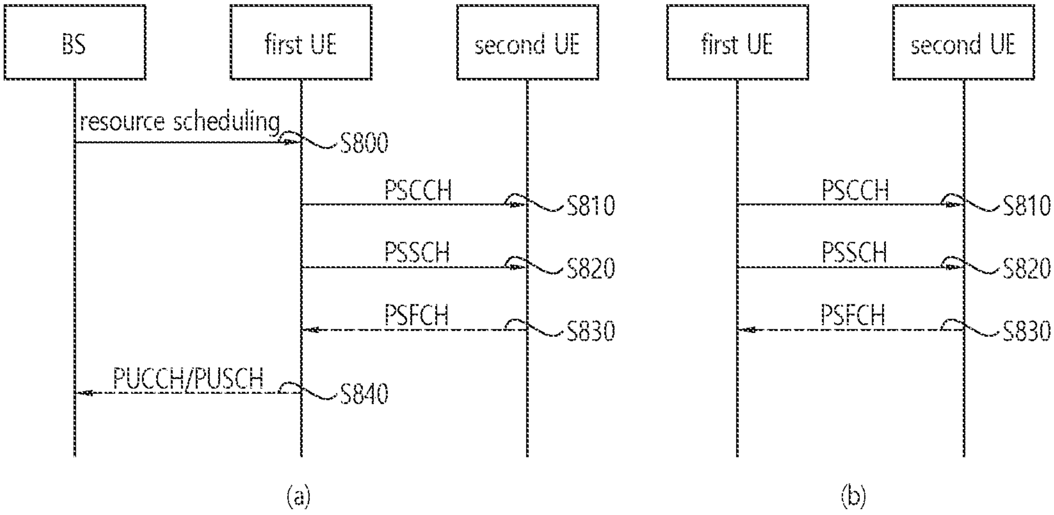
FIG. 8 shows a procedure of performing V2X or SL communication by a UE based on a resource allocation mode, based on an embodiment of the present disclosure.

FIG. 8 shows a procedure of performing V2X or SL communication by a UE based on a resource allocation mode, based on an embodiment of the present disclosure. The embodiment of FIG. 8 may be combined with various embodiments of the present disclosure.

Referring to (a) of FIG. 8, in a resource allocation mode 1, abase station may schedule SL resource(s) to be used by a UE for SL transmission. For example, in step S800, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S810, the first UE may transmit a PSCCH (e.g., sidelink control information (SCI) or 1st-stage SCI) to a second UE based on the resource scheduling. In step S820, the first UE may transmit a PSSCH (e.g., $2^{nd}$-stage SCI, MAC PDU, data, etc.) related to the PSCCH to the second UE. In step S830, the first UE may receive a PSFCH related to the PSCCH/PSSCH from the second UE. For example, HARQ feedback information (e.g., NACK information or ACK information) may be received from the second UE through the PSFCH.

In step S840, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling.

Referring to (b) of FIG. 8, in a resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool.

For example, the UE may autonomously select resource(s) within a selection window by performing a sensing procedure and a resource (re)selection procedure. For example, the sensing may be performed in a unit of subChannel(s). For example, in step S810, a first UE which has selected resource(s) from a resource pool by itself may transmit a PSCCH (e.g., sidelink control information (SCI) or 1st-stage SCI) to a second UE by using the resource(s). In step S820, the first UE may transmit a PSSCH (e.g., $2^{nd}$-stage SCI, MAC PDU, data, etc.) related to the PSCCH to the second UE. In step S830, the first UE may receive a PSFCH related to the PSCCH/PSSCH from the second UE.

Referring to (a) or (b) of FIG. 8, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a 1st-stage SCI or a 1st-stage SCI format, and a SCI transmitted through a PSSCH may be referred to as a $2^{nd}$ SCI, a second SCI, a $2^{nd}$-stage SCI or a $2^{nd}$-stage SCI format.

For example, the $1^{st}$-stage SCI format may include a SCI format 1-A and/or a SCI format 1-B, and the $2^{nd}$-stage SCI format may include a SCI format 2-A, a SCI format 2-B, a SCI format 2-C and/or a SCI format 2-D.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2(N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits Beta_offset indicator—2 bits as provided by higher layer parameter sl-BetaOffsets2ndSCI Number of DMRS port—1 bit Modulation and coding scheme—5 bits Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 3

CSI request—1 bit

TABLE 3

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 8, in step S830, the first UE may receive the PSFCH. For example, the first UE and the second UE may determine a PSFCH resource, and the second UE may transmit HARQ feedback to the first UE using the PSFCH resource.

Referring to (a) of FIG. 8, in step S840, the first UE may transmit SL HARQ feedback to the base station through the PUCCH and/or the PUSCH.

Hereinafter, a hybrid automatic repeat request (HARQ) procedure will be described.

For example, the SL HARQ feedback may be enabled for unicast. For example, the SL HARQ feedback may be enabled for groupcast. For example, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit negative acknowledgement (NACK) to the transmitting UE through a PSFCH. Otherwise, if the receiving UE decodes the PSCCH of which the target is the receiving UE and if the receiving UE successfully decodes the transport block related to the PSCCH, the receiving UE may not transmit positive acknowledgement (ACK) to the transmitting UE.

(2) Groupcast option 2: After the receiving UE decodes the PSCCH of which the target is the receiving UE, if the receiving UE fails in decoding of the transport block related to the PSCCH, the receiving UE may transmit NACK to the transmitting UE through the PSFCH. In addition, if the receiving UE decodes the PSCCH of which the target is the receiving UE and if the receiving UE successfully decodes the transport block related to the PSCCH, the receiving UE may transmit ACK to the transmitting UE through the PSFCH.

Hereinafter, UE procedure for reporting HARQ-ACK on sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ $(0 \le k < T'_{max})$ has a PSFCH transmission occasion resource if k mod $N^{PSFCH}_{PSSCH}=0$, where $t'^{SL}_k$ is a slot that belongs to the resource pool, $T'_{max}$ is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i+j\cdot N^{PSFCH}_{PSSCH})\cdot M^{PSFCH}_{subch,slot}, (i+1+j\cdot N^{PSFCH}_{PSSCH})\ M^{PSFCH}_{subch,slot}-1]$ PRBs from the $M_{PRB,set}{}^{PSFCH}$ PRBs to slot i among the PSSCH slots associated with the PSFCH slot and sub-channel j, where $M^{PSFCH}_{subch,slot}=M^{PSFCH}_{PRB,set}/(N_{subch}\cdot N^{PSFCH}_{PSSCH})$, $0<i<N^{PSFCH}_{PSSCH}$, $0<j<N_{subch}$, and the allocation starts in an ascending order of i and continues in an ascending order of j. The UE expects that $M^{PSFCH}_{PRB,set}$ is a multiple of $N_{subch}\cdot N^{PSFCH}_{PSSCH}$.

A UE determines a number of PSFCH resources available for multiplexing HARQ-ACK information in a PSFCH transmission as $R^{PSFCH}_{PRB,CS}=N^{PSFCH}_{type}\cdot M^{PSFCH}_{subch,slot}\cdot N^{PSFCH}CS$ where $N^{PSFCH}CS$ is a number of cyclic shift pairs for the resource pool and, based on an indication by higher layers,

- $N^{PSFCH}_{type}=1$ and the $M^{PSFCH}$subch,slot PRBs are associated with the starting sub-channel of the corresponding PSSCH
- $N^{PSFCH}_{type}=N^{PSSCH}_{subch}$ and the $N^{PSSCH}_{subch}\ M^{PSFCH}_{subch,slot}$ PRBs are associated with one or more sub-channels from the $N^{PSSCH}_{subch}$ sub-channels of the corresponding PSSCH The PSFCH resources are first indexed according to an ascending order of the PRB index, from the $N^{PSFCH}_{type}\ M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID}) \bmod R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift α, from a cyclic shift pair index corresponding to a PSFCH resource index and from $N^{PSFCH}_{CS}$ using Table 4.

TABLE 4

| | $m_0$ | | | | | |
|---|---|---|---|---|---|---|
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

The UE applies one cyclic shift from a cyclic shift pair to a sequence used for the PSFCH transmission.

Meanwhile, a set of (equally spaced) non-contiguous RBs on a frequency may be allocated to a UE. This set of non-contiguous RBs may be referred to as interlaced RBs. This may be useful in spectrum (e.g., shared spectrum) that is subject to regulations such as occupied channel bandwidth (OCB), power spectral density (PSD), etc.

Figure 9:
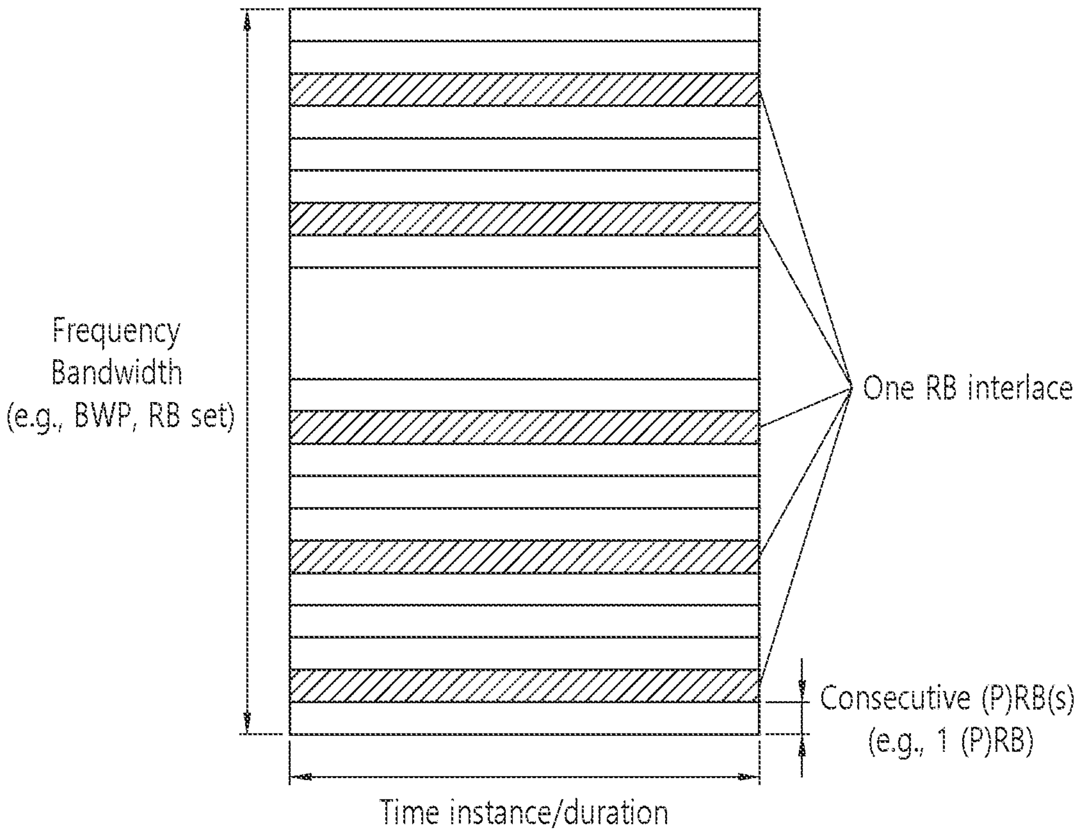
FIG. 9 shows an interlaced RB, based on an embodiment of the present disclosure.

FIG. 9 shows an interlaced RB, based on an embodiment of the present disclosure. The embodiment of FIG. 9 may be combined with various embodiments of the present disclosure.

Referring to FIG. 9, interlaces of RBs may be defined in a frequency domain. An interlace $m\in\{0, 1, \ldots, M-1\}$ may comprise (common) RBs $\{m, M+m, 2M+m, 3M+m, \ldots\}$ where M may represent the number of interlaced RBs given by Table 5.

TABLE 5

| u | M |
|---|---|
| 0 | 10 |
| 1 | 5 |

A communication device (e.g., a device, a UE, a vehicle, a drone, etc. proposed in various embodiments of the present disclosure) may transmit a signal/channel by using one or more interlaced RBs.

Meanwhile, in the next-generation system, the UE may perform a sidelink transmission operation and/or a sidelink reception operation in an unlicensed band. Meanwhile, for the operation in the unlicensed band, a channel sensing operation (e.g., energy detection/measurement) for a channel to be used may be performed before the UE performs transmission, depending on band-specific regulations or requirements. Only if the channel or the set of RBs to be used is determined to be IDLE as a result of the channel sensing (e.g., if the measured energy is less than or equal to a specific threshold), the UE may perform transmission in the unlicensed band. If the channel or the RB set to be used is determined to be BUSY as a result of the channel sensing (e.g., if the measured energy is greater than or equal to a specific threshold), the UE may cancel all or part of transmission in the unlicensed band. Meanwhile, in the operation in the unlicensed band, the UE may skip or simplify the channel sensing operation (make a channel sensing interval relatively small) within a certain time after transmission within a specific time duration. On the other hand, after the certain time has passed after the transmission, the UE may determine whether to transmit after performing the usual channel sensing operation. Meanwhile, for transmission in the unlicensed band, power spectral density (PSD) and/or a size of frequency occupation domain and/or a time interval of a signal/channel transmitted by the UE may be greater than or equal to a certain level, respectively, depending on regulations or requirements. Meanwhile, in the unlicensed band, in order to simplify channel sensing, it may be informed through channel occupancy time (COT) duration information that a channel obtained based on initial general channel sensing is occupied for a certain time, and the maximum length of the COT duration may be configured differently depending on a channel access priority class (CAPC) or a priority value of a data packet or a service.

For example, a TYPE 2A SL channel access may be performed in a sensing interval T_short_sl=25 us, where the interval may consist of a duration T_f=16 us immediately followed by one sensing slot and T_f may include a sensing slot at start of T_f.

For example, in the case of a TYPE 2B SL channel access, the UE may perform transmission immediately after sensing a channel to be idle within a duration of T_f=16 us. T_f may include a sensing slot that occurs within the last 9 us of T_f For example, in the case of a TYPE 2C SL channel access, the UE may not perform channel sensing. Instead, the time duration of SL transmission may be at most 584 us.

For example, in the case of a TYPE 1 SL channel access, the UE may randomly derive an integer value N based on a contention window size corresponding to a priority class. Then, if a channel sensing result for a defer duration T_d corresponding to the priority class is idle, the UE may decrease the N−1 counter value in units of T_sl when IDLE. If the value of the counter is zero, the UE may occupy the RB set or the channel subject to channel sensing. If a part of a channel sensing result for the T_sl duration is determined to be busy, the UE may keep the counter value until a channel sensing result for the defer duration T_d is idle, and the UE may continue to perform channel sensing. In the above, the defer duration T_d may consist of T_f=16 us and contiguous m_p*T_sl after T_f=16 us, where m_p may be a value determined by the priority class (p), and T_sl=9 us may be a time interval in which channel sensing is performed.

Hereinafter, a channel access priority class (CAPC) is described.

The CAPCs of MAC CEs and radio bearers may be fixed or configured to operate in FRI:

- Fixed to lowest priority for padding buffer status report (BSR) and recommended bit rate MAC CE;
- Fixed to highest priority for SRB0, SRB1, SRB3 and other MAC CEs;
- Configured by the base station for SRB2 and DRB.

When selecting a CAPC of a DRB, the base station considers fairness between other traffic types and transmissions while considering 5QI of all QoS flows multiplexed to the corresponding DRB. Table 6 shows which CAPC should be used for standardized 5QI, that is, a CAPC to be used for a given QoS flow. For standardized 5QI, CAPCs are defined as shown in the table below, and for non-standardized 5QI, the CAPC with the best QoS characteristics should be used.

TABLE 6

| CAPC | 5QI |
|---|---|
| 1 | 1, 3, 5, 65, 66, 67, 69, 70, 79, 80, 82, 83, 84, 85 |
| 2 | 2, 7, 71 |
| 3 | 4, 6, 8, 9, 72, 73, 74, 76 |
| 4 | — |

NOTE:
A lower CAPC value indicates a higher priority.

Table 7 shows that $m_p$, a minimum contention window (CW), a maximum CW, a maximum channel occupancy time (MCOT), and an allowed CW size vary depending on channel access priority classes, in DL.

TABLE 7

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Referring to Table 7, a contention window size (CWS), a maximum COT value, etc. for each CAPC may be defined. For example, $T_d$ may be equal to $T_f+m_p*T_{sl}(T_d=T_f+m_p*T_{sl})$.

Table 8 shows that $m_p$, a minimum contention window (CW), a maximum CW, a maximum channel occupancy time (MCOT), and an allowed CW size vary depending on channel access priority classes, in UL.

TABLE 8

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

Referring to Table 8, a contention window size (CWS), a maximum COT value, etc. for each CAPC may be defined. For example, $T_d$ may be equal to $T_f$+$m_p$*$T_{sl}$($T_d$=$T_f$+$m_p$* $T_{sl}$).

Meanwhile, according to the specification in the unlicensed band, sidelink transmission may be transmitted over multiple spaced apart RBs. Meanwhile, for uplink channel transmission in the unlicensed band, the UE may be provided by the base station with a single or multiple RB set(s) and a single or multiple interlaces, and the final transmission resource may be determined as the intersection of RBs corresponding to the provided interlace(s) and RBs within the provided RB set(s). Meanwhile, the interlace may be defined in a common RB (CRB) grid. In the CRB grid, for a set of RBs spaced 10 RBs apart in the case of 15 kHz and a set of RBs spaced 5 RBs apart in the case of 30 kHz, an interlace index of each interlace may be determined based on an RB offset with respect to CRB #0. Meanwhile, in the case of sidelink communication, sensing and/or resource (re)selection may be performed on a subChannel basis, and it may therefore be desired to represent a subChannel in the form of an RB set and/or an interlace. An advantage of this is that the subChannel-based sensing operation and/or resource scheduling method can be reused as much as possible.

Meanwhile, in the case of 60 kHz, an interlace structure is not defined. If sidelink transmission and reception are based on 60 kHz SCS, a new method may be needed to ensure that the size of the bandwidth within the occupied channel is greater than or equal to a certain ratio (e.g., 80%) of the channel size, depending on occupied channel bandwidth (OCB) requirements.

In an embodiment of the present disclosure, the embodiment for 60 kHz SCS can be extended and applied to SCS other than 15 kHz and/or 30 kHz SCS. In an embodiment of the present disclosure, the embodiment for 60 kHz SCS can be extended and applied to 15 kHz and/or 30 kHz SCS.

Meanwhile, significantly increasing the number of allocated PRBs for sidelink transmission to meet OCB requirements and PSD requirements may result in a shortage of frequency-side resources, particularly for PSFCH resources. Meanwhile, if a small number of PRBs are allocated and located at the end of the channel to satisfy OCB requirements, total transmit power may be limited by PSD requirements.

Meanwhile, OCB requirements may be temporarily skipped within a channel occupancy time (COT) duration, in which case the occupied channel bandwidth still needs to be greater than and/or equal to 2 MHz.

Meanwhile, based on the maximum value of channel sensing, the min-PSSCH-to-PSFCH timing may not be satisfied in the case of CAPC=3 or 4. Meanwhile, if the contention window size in the type 1 channel access procedure is small and/or the counter value N for the number of sensing slots is selected to be small enough by random selection, the min-PSSCH-to-PSFCH timing may be satisfied even if a CAPC value is large.

For example, the maximum CAPC value for a PSFCH may be (pre-)configured or pre-configured (e.g., 1 or 2). For example, if a CAPC value for a PSCCH/PSSCH corresponding to a PSFCH is greater than the maximum CAPC value and/or if an initial CAPC value for a PSFCH is greater than the maximum CAPC value, the final CAPC value for the PSFCH may be changed to the maximum CAPC value. For example, if the CAPC value for the PSCCH/PSSCH corresponding to the PSFCH or the initial CAPC value for the PSFCH is 1 or 2, the final CAPC value for the corresponding PSFCH may be 1. For example, if the CAPC value for the PSCCH/PSSCH corresponding to the PSFCH or the initial CAPC value for the PSFCH is 3 or 4, the final CAPC value for the corresponding PSFCH may be 2. For example, when performing the type 1 channel access procedure for a PSFCH, the smallest contention window size may always be used. For example, when performing the type 1 channel access procedure for a PSFCH, the contention window size or the maximum value thereof may be separately (pre-)configured. For example, contention window size adjustment may not be applied/used for PSFCH transmission.

For example, the CAPC value and/or the criteria for determining the CAPC value may be different when the short control signaling exemption is applied for PSFCH transmission versus when it is not applied. For example, if the short control signaling exemption is applied for PSFCH transmission, the CAPC value may be fixed to 1 or 4.

For example, after receiving and detecting a PSCCH/PSSCH, the UE may attempt to transmit again in the next PSFCH occasion when dropping a PSFCH due to LBT failure in N PSFCH occasions associated with the PSCCH/PSSCH. For example, the UE may attempt to transmit in the remaining PSFCH occasions until transmission is successful for the dropped PSFCH. That is, the UE may continue to attempt to transmit in the event of an unsuccessful transmission after LBT failure even if the transmission is dropped due to prioritization in the middle.

Figure 10:
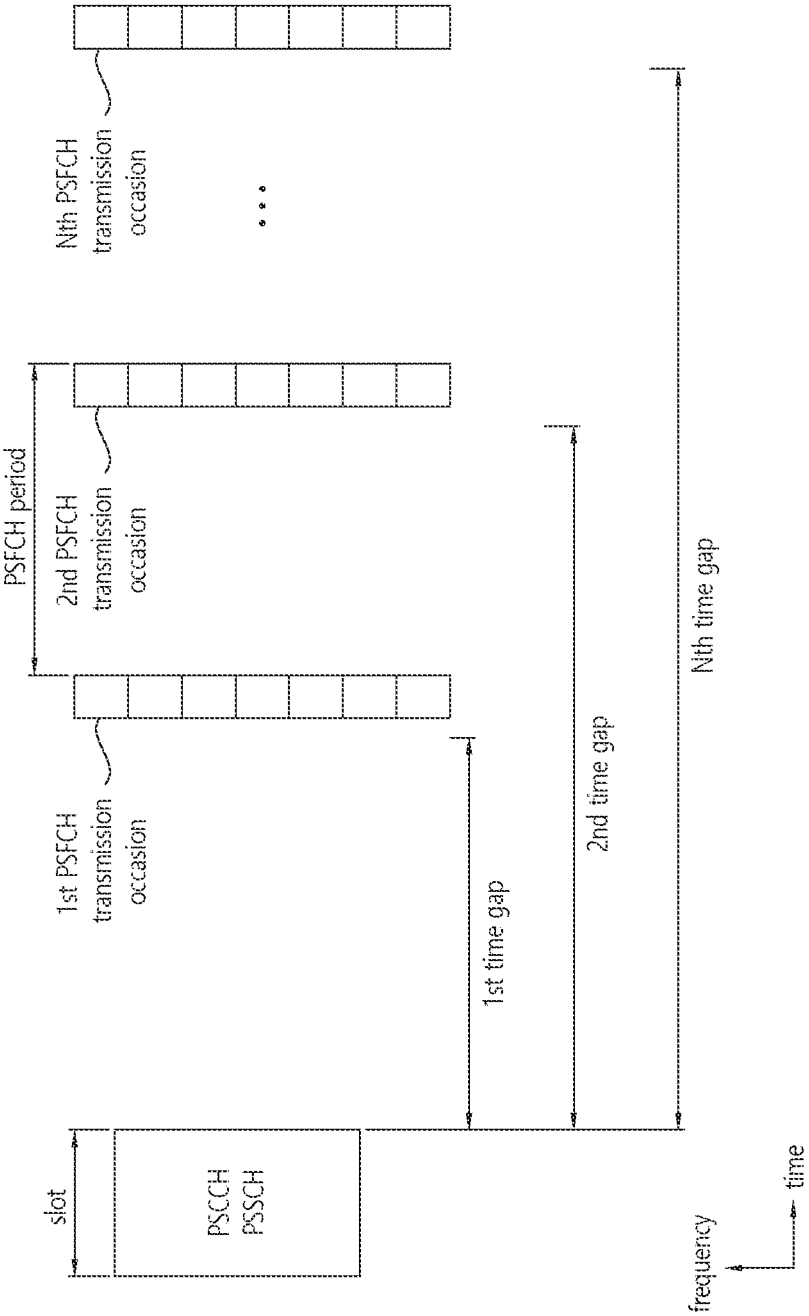
FIG. 10 shows a method of attempting to transmit a PSFCH in a slot only if a UE fails to transmit the PSFCH related to the PSSCH in all previous slots for the PSFCH within N PSFCH slots, based on an embodiment of the present disclosure.

FIG. 10 shows a method of attempting to transmit a PSFCH in a slot only if a UE fails to transmit the PSFCH related to the PSSCH in all previous slots for the PSFCH within N PSFCH slots, based on an embodiment of the present disclosure. The embodiment of FIG. 10 may be combined with various embodiments of the present disclosure.

Referring to FIG. 10, N PSFCH occasions may be configured for one PSCCH/PSSCH resource. A UE that has received/decoded a PSCCH/PSSCH on the PSCCH/PSSCH resource may attempt to transmit a PSFCH in a first PSFCH transmission occasion. If the UE drops PSFCH transmission in the first PSFCH transmission due to channel access failure, prioritization, etc., the UE may attempt to transmit a PSFCH in a second PSFCH transmission occasion. In this case, if the UE drops PSFCH transmission in the second PSFCH transmission occasion due to channel access failure, prioritization, etc., the UE may attempt to transmit a PSFCH in a third PSFCH transmission occasion. That is, the UE may attempt to transmit a PSFCH in a slot only if the UE fails to transmit the PSFCH related to the PSSCH in all previous slots for the PSFCH within N PSFCH transmission occasions.

For example, if the UE drops PSFCH transmission based on SL and/or UL prioritization in the first PSFCH occasion, the UE may skip the PSFCH retransmission attempt even in the remaining PSFCH occasions.

Meanwhile, if the UE uses multiple PRBs for a single PSFCH transmission to satisfy OCB requirements, PSFCH resources may be insufficient. For example, the UE may use multiple sequence IDs when generating a PSFCH resource.

For example, an additional second sequence ID may be derived from a first sequence ID that is (pre-)configured for a PSFCH. For example, the second sequence ID may be in the form of the first sequence ID plus a pre-defined offset value (e.g., 1 or 2) and/or a (pre-)configured offset value. For example, the second sequence ID may be (pre-)configured.

For example, the UE may use different PSFCH sequence IDs based on the received PSSCH (earliest or latest) slot, and/or based on the time difference (e.g., in units of slots) between the received PSSCH and the transmitted PSFCH, and/or based on the PSFCH occasion order. For example, the UE may use different PSFCH sequence IDs based on the PSFCH occasion for the received PSSCH.

Meanwhile, in the conventional procedure for determining the PSFCH resource, the interlace structure is not considered. Therefore, the UE transmitting a PSSCH cannot determine a PSFCH resource with the interlace structure, and therefore cannot perform PSFCH monitoring/receiving for the PSSCH. Similarly, the UE receiving the PSSCH cannot perform PSFCH transmission for the PSSCH because it cannot determine the PSFCH resource with the interlace structure. As a result, the reliability of sidelink communication in the unlicensed band may not be guaranteed. Therefore, to support interlaced PSFCH transmission and reception in the unlicensed band, the UE may additionally consider an interlace index when determining a PSFCH resource.

For example, when selecting the PSFCH resource for the received PSSCH, the UE may select a PRB subgroup and/or an interlace/RB set subgroup for the PSFCH, and/or may perform PSFCH resource indexing for the PRB subgroup and/or the interlace/RB set subgroup in the following order: PRB index or interlace/RB set index, cyclic shift pair index, and sequence ID index. In the present disclosure, the subgroup may be referred to as a subset.

Figure 11:
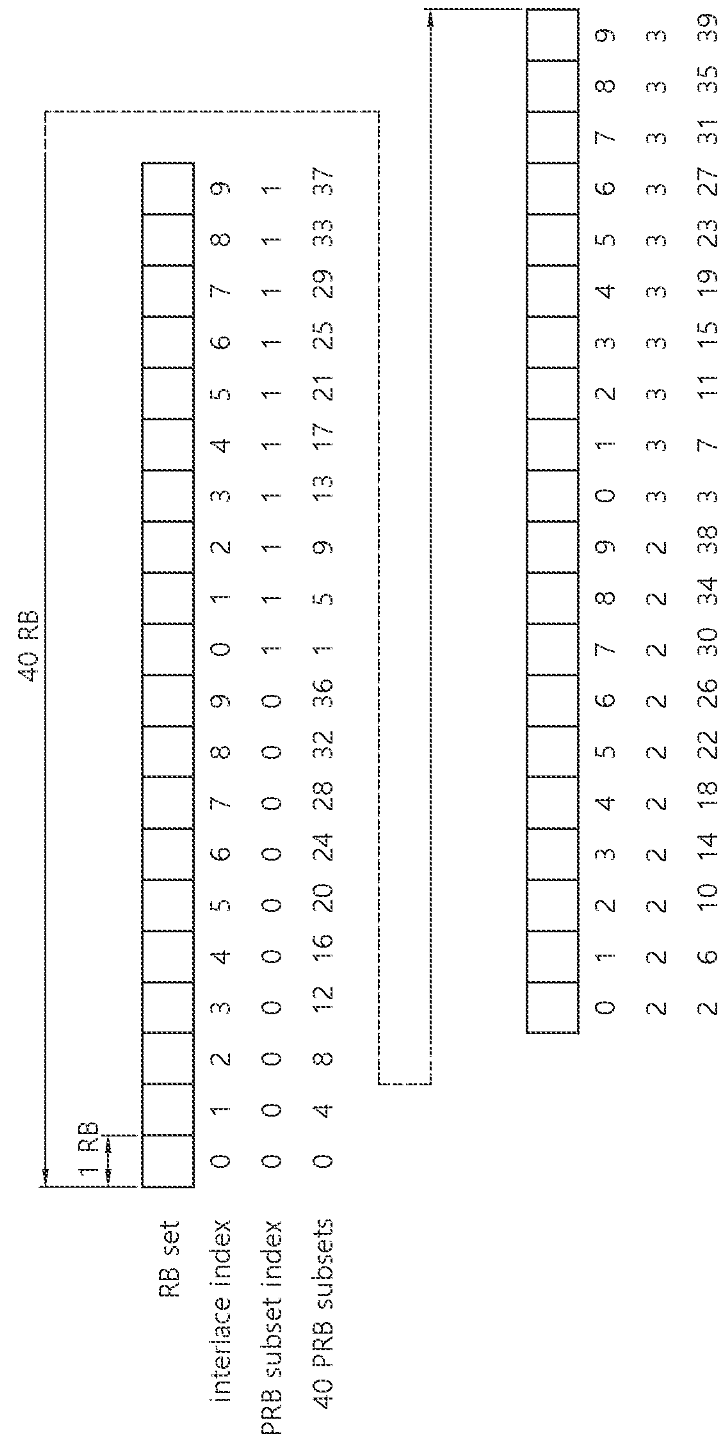
FIG. 11 shows an example of resource indexing for PSFCH transmission and reception, based on an embodiment of the present disclosure.

FIG. 11 shows an example of resource indexing for PSFCH transmission and reception, based on an embodiment of the present disclosure. The embodiment of FIG. 11 may be combined with various embodiments of the present disclosure.

In the embodiment of FIG. 11, it is assumed that an RB set includes 40 RBs and that the same interlace index is allocated at 10 RB intervals. In addition, it is assumed that a PRB subset for PSFCH includes 1 RB. In this case, the UE may determine interlace indexes, and the UE may select/determine PRB subsets for PSFCH within the RB set. In addition, for the PRB subsets, the UE may perform PSFCH resource indexing based on PRB indexes and/or interlace indexes. Specifically, referring to FIG. 11, if the PRB subset for the PSFCH includes 1 RB, the UE may determine 40 PRB subsets by indexing first in ascending order of PRB subset index and indexing second in ascending order of interlace index.

Figure 12:
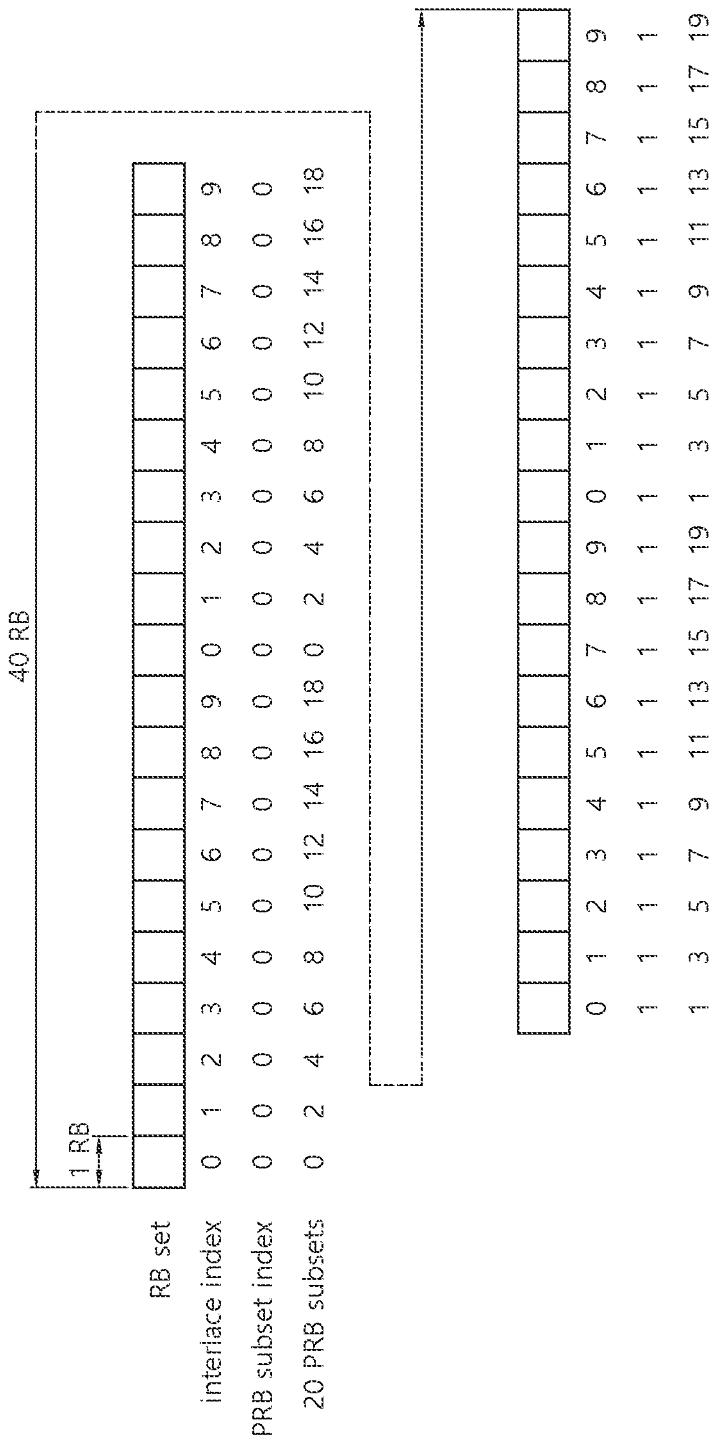
FIG. 12 shows an example of resource indexing for PSFCH transmission and reception, based on an embodiment of the present disclosure.

FIG. 12 shows an example of resource indexing for PSFCH transmission and reception, based on an embodiment of the present disclosure. The embodiment of FIG. 12 may be combined with various embodiments of the present disclosure.

In the embodiment of FIG. 12, it is assumed that an RB set includes 40 RBs and that the same interlace index is allocated at 10 RB intervals. In addition, it is assumed that a PRB subset for PSFCH includes 2 RBs. In this case, the UE may determine interlace indexes, and the UE may select/determine PRB subsets for PSFCH within the RB set. In addition, for the PRB subsets, the UE may perform PSFCH resource indexing based on PRB indexes and/or interlace indexes. Specifically, referring to FIG. 12, if the PRB subset for the PSFCH includes 2 RBs, the UE may determine 20 PRB subsets by indexing first in ascending order of PRB subset index and indexing second in ascending order of interlace index.

Figure 13:
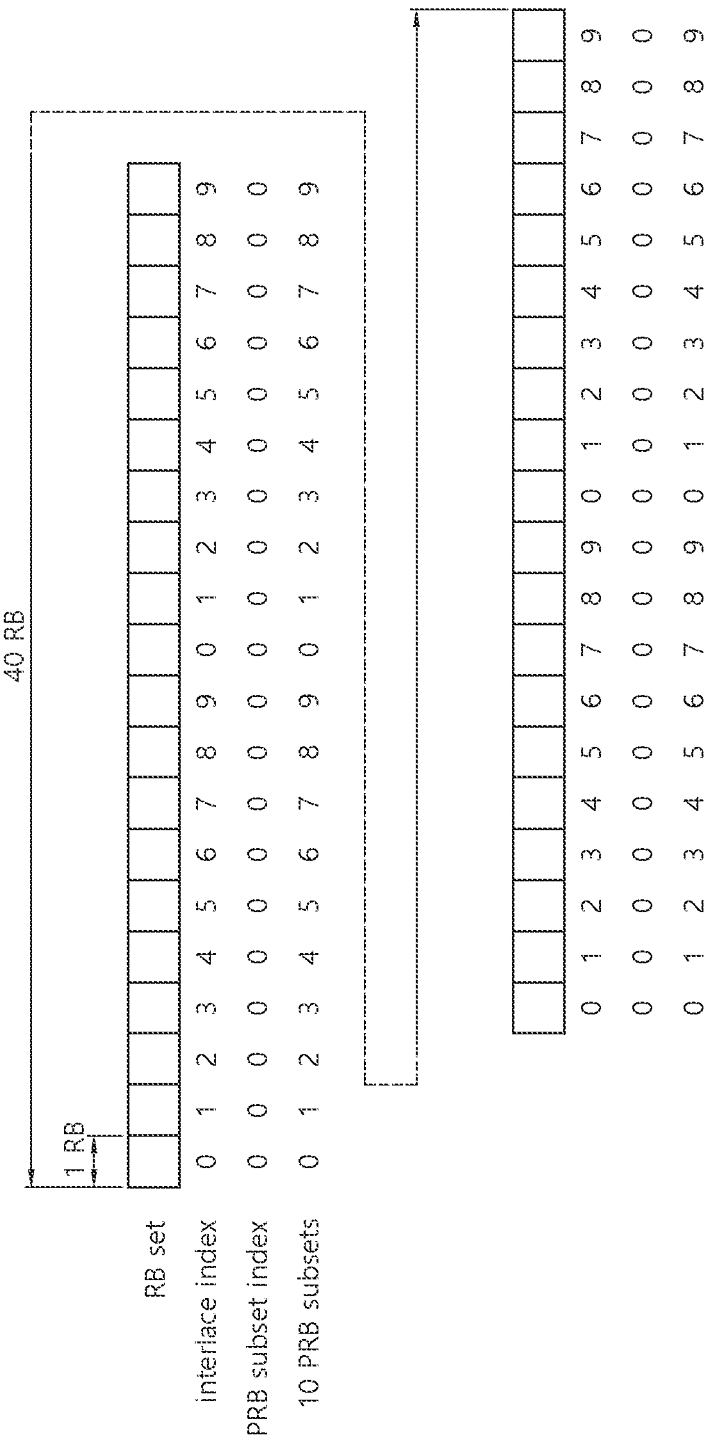
FIG. 13 shows an example of resource indexing for PSFCH transmission and reception, based on an embodiment of the present disclosure.

FIG. 13 shows an example of resource indexing for PSFCH transmission and reception, based on an embodiment of the present disclosure. The embodiment of FIG. 13 may be combined with various embodiments of the present disclosure.

In the embodiment of FIG. 13, it is assumed that an RB set includes 40 RBs and that the same interlace index is allocated at 10 RB intervals. In addition, it is assumed that a PRB subset for PSFCH includes 4 RBs. In this case, the UE may determine interlace indexes, and the UE may select/determine PRB subsets for PSFCH within the RB set. In addition, for the PRB subsets, the UE may perform PSFCH resource indexing based on PRB indexes and/or interlace indexes. Specifically, referring to FIG. 13, if the PRB subset for the PSFCH includes 4 RBs, the UE may determine 10 PRB subsets by indexing first in ascending order of PRB subset index and indexing second in ascending order of interlace index.

For example, the PRB subgroup and/or the interlace/RB set subgroup may be determined based on the (starting or allocated) subChannel and/or interlace and/or RB set of the PSSCH corresponding to the PSFCH. For example, the PRB index or the interlace/RB set index, the cyclic shift pair index, the sequence ID index within the subgroup may be determined based on the (starting or ending) slot of the PSSCH corresponding to the PSFCH and/or a source ID of the PSSCH and/or an M_ID value of the UE.

For example, the UE may define and index PSFCH resources in the following order: PRB index and/or interlace/RB set index, and/or cyclic shift index, and/or sequence ID index. For example, the UE may select a subgroup for the indexed PSFCH resources based on the (starting or allocated) subChannel and/or interlace and/or RB set and/or (starting or ending) slot of the PSSCH corresponding to the PSFCH, and/or determine the final PSFCH resource within the subgroup based on a source ID of the PSSCH and/or M_ID information of the UE.

In the embodiment(s) of the present disclosure, the sequence ID may be used as a random seed when generating a sequence for the PSFCH.

In the embodiment(s) of the present disclosure, it has been described that a second sequence ID is used in addition to a first sequence ID for PSFCH sequence generation, but increasing the amount of PSFCH resources by using more sequence IDs can be extended from the idea of the present disclosure.

Meanwhile, if the UE uses dedicated PRB(s) including HARQ-ACK feedback information in PSFCH transmission and a common PRB to satisfy OCB requirements, transmit power may be distributed between the dedicated PRB(s) and the common PRB. This may cause power spectral density (PSD) and/or transmit power allocated to the dedicated PRB(s) to be too low, resulting in poor detection performance for SL HARQ-ACK feedback. For example, if the UE performs multiple PSFCH transmissions, the UE may use the same dedicated PRB or different dedicated PRBs for transmission for each SL HARQ-ACK feedback, and PSD and/or transmit power allocated to the common PRB (combination) and/or the common PRB may be the same regardless of the number of PSFCH transmissions. For example, if the UE performs multiple PSFCH transmissions, PSD and/or transmit power allocated to the common PRB (combination) and/or the common PRB may increase based on the number of PSFCH transmissions and/or the number of dedicated PRBs.

For example, the UE may skip and/or deprioritize PSFCH transmission based on allocated power and/or PSD for dedicated PRB(s). For example, the situation may be when the allocated power and/or the PSD for the dedicated PRB(s) is less than or equal to a specific threshold. For example, the specific threshold may be (pre-)configured or predefined per PSFCH priority value and/or per PSFCH CAPC value and/or per resource pool and/or per SL BWP and/or per SL carrier and/or per congestion control level. For example, deprioritizing PSFCH transmission may mean that it has lower priority than SL transmission with a higher SL priority value, and/or it has lower priority than UL, regardless of the PSFCH priority value, when colliding with the UL.

For example, in the case of PSFCH drop due to LBT failure in N PSFCH occasions for a received PSSCH, transmission may be attempted again in the next PSFCH occasion. For example, the transmission may be attempted in the remaining PSFCH occasions until transmission is successful for the dropped PSFCH. That is, transmission attempts may continue in the event of the unsuccessful transmission after LBT failure, even if it is dropped due to prioritization in the middle. For example, if the UE drops PSFCH transmission according to the SL and/or UL prioritization procedure in the first PSFCH occasion for the received PSSCH, the UE may not perform transmission attempts in the subsequent remaining PSFCH occasions.

For example, the UE may use both dedicated PRB(s) including HARQ-ACK feedback information in PSFCH transmission and a common PRB to satisfy OCB requirements. In this case, a sequence that maps to the common PRB may be the same PSFCH sequence that maps to a specific dedicated PRB and/or a phase rotated version thereof. For example, the specific dedicated PRB may correspond to the one with the smallest SL priority value (within an RB set to which the common PRB and/or the dedicated PRB(s) belongs) for multiple PSFCH transmissions transmitted by the UE. For example, different UEs may map each PSFCH sequence that maps to each dedicated PRB to the same PRB(s), but a UE receiving a PSFCH may (opportunistically) use PSFCH sequences transmitted in the common PRB and the dedicated PRB(s) for HARQ-ACK feedback detection.

For example, the UE may transmit a PSFCH using a single or multiple common PRBs and a single or multiple dedicated PRBs for the same SL HARQ-ACK feedback. For example, between different SL HARQ-ACK feedbacks, dedicated PRBs may be different and/or cyclic shift pairs may be different within the same dedicated PRB. For example, between different HARQ-ACK feedbacks, all or part of common PRBs may be the same. For example, the UE may perform phase rotation when transmitting the PSFCH using common PRB(s) and dedicated PRB(s), e.g., for the purpose of lowering PAPR in units of PRB, etc.

Meanwhile, in the unlicensed band, in the case of the NACK-only feedback method, the problem of DTX being determined to be ACK due to LBT failure may become serious, and as a result, the NACK-only feedback or the groupcast HARQ-ACK feedback option 1 may not be supported in the unlicensed band. Meanwhile, in the case of the groupcast HARQ-ACK feedback option 2, if PSFCH resources are insufficient compared to a group size for receiving UEs (e.g., if the number of UEs in the group or the value minus 1 is greater than the number of PSFCH resources within a PSFCH RB group associated with a specific PSSCH resource), the groupcast HARQ-ACK feedback option 1 may be used instead.

For example, if PSFCH resources are insufficient compared to the group size for the groupcast HARQ-ACK feedback option 2, the transmitting UE may disable HARQ-ACK feedback instead of the groupcast HARQ-ACK feedback option 2. For example, if PSFCH resources are insufficient compared to the group size for the groupcast HARQ-ACK feedback option 2, a plurality of receiving UEs may commonly use a PSFCH resource for NACK feedback for a groupcast PSSCH, and/or the plurality of receiving UEs may be allocated dedicated PSFCH resources for ACK feedback (e.g., PSFCH resources are distinguished based on M_ID). For example, even when sharing PSFCH resources according to some of the HARQ-ACK statuses, if the amount of PSFCH resources is small compared to the group size, the transmitting UE may again disable HARQ-ACK feedback.

For example, when transmitting a PSCCH/PSSCH, an RB set (group) and/or an interlace (group) and/or a cyclic shift pair (group) and/or a slot (group) to which a PSFCH resource belongs in response to the PSCCH/PSSCH may be indicated through second SCI.

For example, for the indicated RB set (group) and/or interlace (group) and/or cyclic shift pair (group), the receiving UE may determine a specific RB set and/or interlace and/or cyclic shift pair based on a source ID for the PSCCH/PSSCH and/or a M_ID value of the receiving UE and/or a (lowest) RB set (index) and/or a (lowest) subChannel (index) for the PSCCH/PSSCH.

For example, the RX UE may attempt to transmit a PSFCH starting from the first slot within the slot (group) indicated above, and the RX UE may attempt to transmit the PSFCH in the next slot within the slot (group) if the RX UE fails to perform PSFCH transmission due to LBT failure, etc.

For example, the slot (group) for the PSFCH resource may be limited to falling within PSFCH occasions configured in a resource pool.

For example, information on the slot (group) may include information on the order of a starting PSFCH slot, with the first PSFCH slot after minimum PSSCH-to-PSFCH timing from the PSCCH/PSSCH as the reference point (e.g., a value of 0), and/or information on the number of (contiguous) PSFCH slots belonging to the slot (group), and/or information on the order of PSFCH slot(s) belonging to the slot (group).

For example, after indexing the resource group for the PSFCH indicated through the second SCI in an increasing order of RB set, interlace, and/or cyclic shift index, a PSFCH resource corresponding to a value obtained by calculating the sum of the source ID and M_ID modulo the size of the resource group for the PSFCH may be finally selected for PSFCH transmission.

For example, after indexing the resource group for the PSFCH indicated through the second SCI in an increasing order of interlace, RB set, and/or cyclic shift index, a PSFCH resource corresponding to a value obtained by calculating the sum of the source ID and M_ID modulo the size of the resource group for the PSFCH may be finally selected for PSFCH transmission.

For example, the PSCCH/PSSCH transmitting UE may, when indicating a PSFCH slot, preferentially indicate a PSFCH slot and/or a PSFCH slot for the case where the detected PSCCH/PSSCH exists in the next slot, as SL HARQ-ACK feedback timing. For example, the PSCCH/PSSCH transmitting UE may, when indicating a PSFCH slot, preferentially indicate a PSFCH slot for the case where the PSFCH slot exists within MCSt of the UE or another UE, as SL HARQ-ACK feedback timing.

For example, for PSFCH transmission, common interlace and/or PRB configurations may be different for inside the COT and outside the COT. For example, outside the COT, common PRBs or interlaces may be arranged such that an occupied BW is at least 80% of a total BW for an RB set for PSFCH transmission, and/or inside the COT, common PRBs or interlaces may be arranged such that an occupied BW is at least 2 MHz for an RB set for PSFCH transmission. For example, the location of common PRBs and/or the gap between them may be (pre-)configured separately for inside the COT or outside the COT.

For example, the use of common interlaces and/or common PRBs may be canceled if an occupied BW is equal to or exceeds 2 MHz inside the COT based solely on the configuration of dedicated PRBs in PSFCH transmission.

For example, the relationship and/or spacing between dedicated PRBs may be configured to be at least 1 MHz, considering PSD requirements. For example, a PRB offset between the dedicated PRBs (between start and start and/or between end and end and/or between end and start) may be (pre-)configured. For example, a first set of dedicated PRBs for a first PSFCH resource may be set to not overlap with a second set of dedicated PRBs for a second PSFCH resource. For example, all dedicated PRBs for the same PSFCH resource may exist in the same RB set.

For example, a PSFCH resource subset may be placed/allocated for PSSCH slot(s)-PSSCH subChannel(s)-PSSCH RB set(s) combinations associated with a PSFCH occasion, and/or a PSFCH resource candidate set corresponding to a PSSCH may include a PSFCH resource subset corresponding to a slot-subChannel-RB set allocated for the PSSCH (based on (pre-)configuration). For example, the UE may determine a final PSFCH resource, based on a source ID for the PSSCH and/or an M_ID for the PSFCH transmitting UE, from the PSFCH resource candidate set.

For example, the UE may also use the shared COT of another UE for PSFCH transmission without SL transmission (in TDM form and/or FDM form) targeting the COT initiating UE or PSFCH transmission that satisfies a COT usage condition in a specific situation. For example, the PSFCH transmission may not include transmission to the COT initiating UE but include transmission only to a third UE. For example, the specific situation may be a case where the absence of other RATs is guaranteed for sidelink transmission and/or a case where the corresponding parameter (sl-absenceOfAnyOtherTechnology) is (pre-)configured and/or a case where the PSFCH transmission is the first transmission in the shared COT and/or a case where there is another SL transmission preceding and/or following the PSFCH transmission and/or a case where another SL transmission satisfies the COT usage condition. For example, a time gap between the PSFCH transmission and the preceding and/or following another SL transmission may be less than or equal to a certain level, and/or may belong to the same RB set(s).

In the embodiment(s) of the present disclosure, the various schemes may be applied and/or (pre-)configured differently based on a single PSFCH occasion or multiple PSFCH occasions for a PSSCH and/or based on the number of PSFCH occasions. For example, in the case of a CAPC value for a PSFCH, an upper limit value for the CAPC value may be configured/applied when there is a single PSFCH occasion, and/or no upper limit value for the CAPC value may be applied when there are multiple PSFCH occasions.

Meanwhile, a PSFCH PRB subset or a PSFCH resource subset may be allocated per PSFCH occasion for N PSFCH occasions within each RB set for a (pre-)configured PSFCH PRB set.

For example, for interlaces or a PRB subset or K PSFCH PRBs present or (pre-)configured within an RB set, starting with the lowest PRB or PRB subset or interlace, K/N PRBs or PRB subsets or interlaces may correspond to the first PSFCH occasion, and then K/N PRBs or PRB subsets or interlaces may correspond to the second PSFCH occasion, and so on.

For example, for KPSFCH PRBs present or (pre-)configured within an RB set, starting from the lowest PRB or PRB subset or interlace, PSFCH occasions are increased and may correspond to each PRB or PRB subset or interlace.

In the embodiment(s) of the present disclosure, the RB index may be a PRB index, or may be a CRB index.

In the embodiment(s) of the present disclosure, the method described for each SL channel is not limited to each specified SL channel, and may be extended and applied to different SL channels.

In the embodiment(s) of the present disclosure, the various methods may be applied differently based on the subcarrier spacing size.

In the embodiment(s) of the present disclosure, the various methods may be applied differently based on the sidelink channel type.

In the embodiment(s) of the present disclosure, the various methods may be applied differently based on the CAPC value and/or based on the SL priority value.

In the embodiment(s) of the present disclosure, the various methods may be applied differently based on the RB set and/or based on the size of the RB set and/or based on the presence or absence of a guard band between RB sets.

In the embodiment(s) of the present disclosure, the various methods may be applied differently within the COT and/or outside the COT.

Meanwhile, the number of RBs and the location of RBs included in an RB set, a unit for performing channel sensing, may be different from the number of RBs and the location of RBs included in a subChannel, a unit for performing sidelink communication. Also, the boundary for the RB set and the boundary for the subChannel may not be aligned with each other. Also, depending on a carrier, there may be a guard band between different RB sets. A resource pool for sidelink communication consists of contiguous frequency resources, and considering that PSCCH/PSSCH communication is also transmitted through continuous frequency resources, it may be considered to use the guard band for transmission in a specific situation.

Meanwhile, if all or part of sidelink operation is performed based on an interlaced structure, a structure where different resource pools are FDMed within the same RB set may be supported.

For example, if an interlaced structure is configured/determined for at least sidelink operation, a frequency domain resource included in a resource pool may be (pre-)configured in the form of a starting interlace index and/or a number of (contiguous) interlaces and/or a bitmap for allocated interlaces and/or a starting RB set index and/or a number of (contiguous) RB sets and/or a bitmap for allocated RB sets.

Meanwhile, at least the number of interlaces included in a subChannel may be kept constant.

For example, the number of interlaces in a resource pool (within an RB set) may be limited to a multiple of the number of interlaces included in a subChannel. For example, the UE may expect all or part of CPE lengths used and/or candidate values for them to be identical between different resource pools FDMed within the same RB set.

Meanwhile, a PSCCH is transmitted through the lowest subChannel among subChannels allocated for a PSSCH, and in a specific RB set, the lowest subChannel may not be a subChannel with lowest index. In the above case, assigning a combination of multiple subChannels from the lowest subChannel may not be supported by a resource indicator (FRIV) of SCI.

For example, subChannel indexing may be performed by increasing or decreasing frequency location, starting with an RB set with lowest or highest index, starting with an interlace with lowest or highest location in terms of actual frequency location. Then, after mapping all interlaces, the RB set index may be increased or decreased again and subChannel indexing for interlaces may be performed again. In addition, this may be repeated. That is, in the above situation, the higher indexed interlace may be associated with the lower subChannel index than the lower indexed interlace. For example, for each RB set, a subChannel index may be associated with a lower actual frequency location for a lower index value, and a higher actual frequency location for a higher index value.

For example, after allocating subChannels based on interlace indexes and/or RB set indexes, indexes of the subChannels may be configured/determined in ascending or descending order based on the lowest PRB location of each of the subChannels.

For example, if there are multiple interlaces included in a subChannel, the interlaces may be contiguous based on interlace indexes.

For example, if there are multiple interlaces included in a subChannel, the interlaces may have adjacent (contiguous) actual frequency location.

For example, allocating a plurality of subChannels from the lowest subChannel (in terms of actual frequency location) to which a PSCCH is mapped may be at least one of combinations supported by a resource indicator (FRIV) of SCI. For example, for a plurality of PSSCH allocations where the number of allocated subChannels and the lowest subChannel (in terms of actual frequency location) are the same, the transmitting UE and/or the receiving UE may expect/use PSSCH allocation including the largest or smallest value based on the lowest subChannel index. For example, for a plurality of PSSCH allocations where the number of allocated subChannels and the lowest subChannel (in terms of actual frequency location) are the same, the transmitting UE and/or the receiving UE may expect/use PSSCH allocation including the largest or smallest value based on the highest subChannel index. For example, for a plurality of PSSCH allocations where the number of allocated subChannels and the lowest subChannel (in terms of actual frequency location) are the same, the transmitting UE and/or the receiving UE may expect/use PSSCH allocation in which a subChannel adjacent to the lowest subChannel exists.

For example, an offset value may be further applied for one or more starting subChannel indices indicated by FRIV. For example, the offset value may be (pre-)configured and/or indicated by SCI. For example, the offset value may be the same for a plurality of reserved resources, or may be a different value for each reserved resource. For example, the offset value may be added (respectively) to the allocated subChannel index values derived from the FRIV, and then it may have a value within a specific value range (e.g., from 0 to the number of subChannels in a resource pool—1) through a modulo function. For example, the UE may expect/use as PSSCH allocation resources as many contiguous subChannels (in terms of actual frequency) as the number of allocated subChannels starting from the lowest subChannel (in terms of actual frequency location).

This is to ensure that, when indicating reservation resource information for PSSCH allocation resources in the previous SCI and PSSCH allocation resources derived from the number of subChannels of frequency allocation information and the lowest subChannel obtained through PSCCH BD, the PSSCH allocation resources are the same each other.

Meanwhile, depending on the form of an interlace index structure within an RB set, two interlaces included in a subChannel may be non-contiguous. In the above case, a PSCCH and/or a PSSCH mapped to the subChannel may have significantly reduced detection performance in a frequency-selective channel environment.

For example, the UE may not expect the non-contiguous structure. For example, accordingly, an interlace structure included in a subChannel, starting of an RB set, a guard band, a SL BWP starting RB, etc. may be configured appropriately.

For example, for the subChannel including the non-contiguous interlaces, the UE may not expect a frequency domain of a PSCCH to extend beyond one interlace or to be mapped non-continuously.

In the embodiment(s) of the present disclosure, the non-contiguous structure may mean that two interlaces included in the subChannel are not adjacent to each other in terms of frequency, but are mapped non-contiguously.

In the embodiment(s) of the present disclosure, the non-contiguous structure may mean that two interlaces included in the subChannel are not contiguous to each other in an index domain.

For example, if there are multiple interlaces included in a subChannel for PSSCH transmission with an interlaced structure, a gap between interlace indexes may be (pre-)configured and/or predefined (e.g., 1 or 5). For example, whether non-contiguous interlace indices are included in the same subChannel may be (pre-)configured per resource pool and/or per SL BWP and/or per SL carrier. For example, subChannel #0 may configured with interlace index #0 and interlace index #5, and/or subChannel #1 may be configured with interlace index #1 and interlace index #6 or interlace index #2 and interlace index #7.

For example, when mapping between the subChannel assignment and the PSCCH detection location and/or the FRIV value, transformation may be performed (based on (pre-)configuration and/or SCI indication) and/or the transformation mapping may be {0, 5, 1, 6, 2, 7, 3, 8, 4, 9} for 15 kHz SCS, and/or {0, 3, 1, 4, 2, 5} for 30 kHz SCS. That is, if the starting index of the PSSCH assignment determined based on the FRIV and/or the PSCCH detection is 0, and the number of contiguous indices is 4, the actual subChannel assignment may be subChannel index 0, 5, 1, 6 based on 15 kHz SCS. For example, the transformation mapping scheme may be (pre-)configured per resource pool and/or indicated by SCI.

For example, for PSCCH/PSSCH transmission with an interlace structure, PSSCH DMRS and PSCCH may not be allowed to be FDMed in the same OFDM symbol (at least within the same subChannel). That is, for PSCCH/PSSCH transmission with an interlace structure, PSCCH and PSSCH DMRS may always be TDMed.

For example, for PSCCH/PSSCH transmission with an interlaced structure, PSSCH DMRS and PSCCH may be allowed to be FDMed in the same OFDM symbol (at least within the same subChannel), regardless of the subChannel size and/or the number of PRBs allocated for the PSCCH. This is because the subChannel configuration itself is already composed of discontinuous PRBs, so the channel estimation process can be performed on a PRB basis.

For example, for PSCCH/PSSCH transmission with an interlaced structure, PSSCH DMRS and PSSCH may not be allowed to be FDMed within the same contiguous PRB group (at least within the same subChannel) in the same OFDM symbol.

In the embodiment(s) of the present disclosure, the PSSCH DMRS and the PSCCH not being FDMed may mean that a portion of the PSSCH DMRS is punctured and/or a DMRS pattern that allows FDM is not used.

In the embodiment(s) of the present disclosure, within the same subChannel may be further limited to within an RB set to which PSCCH is mapped.

The embodiment(s) of the present disclosure may be different and/or (pre-)configured per resource pool and/or per transmission outside and/or within a resource pool and/or per QoS parameter and/or per CAPC and/or per SL priority and/or per transmission within or outside COT (when initializing the COT) and/or per transmission order within MCSt and/or per SL channel type and/or per RB set and/or per SL BWP and/or per SL carrier and/or per congestion control level and/or per transmission operation or reception operation and/or per transmit power level and/or per transmission start time and/or per channel access procedure type for transmission and/or per LBT failure ratio and/or per COT initiator UE or COT responded UE or other UE and/or per cast type and/or per SL HARQ-ACK feedback enabled or disabled and/or per HARQ-ACK feedback option and/or per number of transmission attempts for the same information or TB. In the embodiment(s) of the present disclosure, (pre-)configuration may be performed per resource pool and/or per transmission outside and/or within a resource pool and/or per QoS parameter and/or per CAPC and/or per SL priority and/or per transmission within or outside COT (when initializing the COT) and/or per transmission order within MCSt and/or per SL channel type and/or per RB set and/or per SL BWP and/or per SL carrier and/or per congestion control level and/or per transmission operation or reception operation and/or per transmit power level and/or per transmission start time and/or per channel access procedure type for transmission and/or per LBT failure ratio and/or per COT initiator UE or COT responded UE or other UE and/or per cast type and/or per SL HARQ-ACK feedback enabled or disabled and/or per HARQ-ACK feedback option and/or per number of transmission attempts for the same information or TB.

Figure 14:
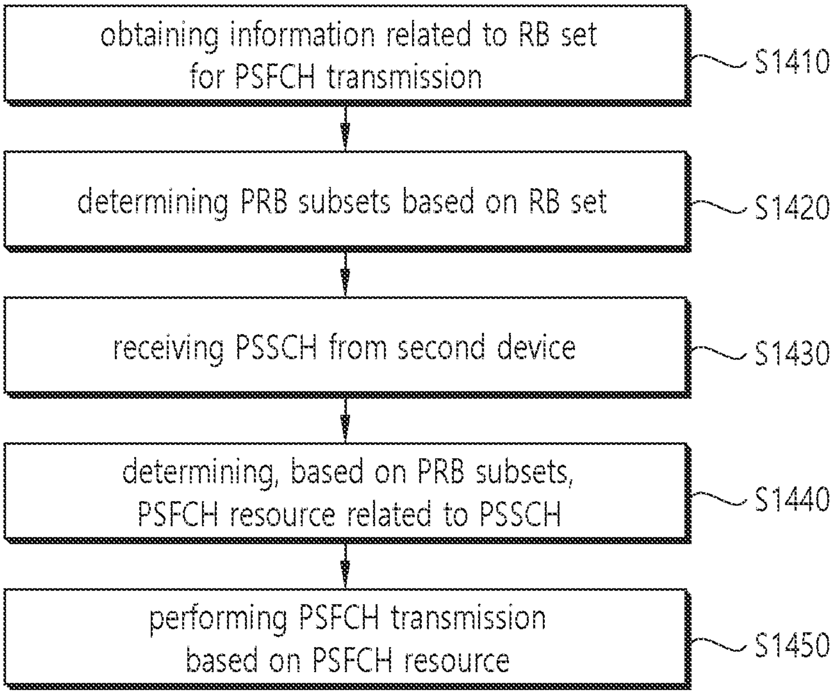
FIG. 14 shows a method for a first device to perform wireless communication, based on an embodiment of the present disclosure.

FIG. 14 shows a method for a first device to perform wireless communication, based on an embodiment of the present disclosure. The embodiment of FIG. 14 may be combined with various embodiments of the present disclosure.

Referring to FIG. 14, in step S1410, the first device may obtain information related to a resource block (RB) set for physical sidelink feedback channel (PSFCH) transmission. In step S1420, the first device may determine physical resource block (PRB) subsets based on the RB set. In step S1430, the first device may receive a physical sidelink shared channel (PSSCH) from a second device. In step S1440, the first device may determine, based on the PRB subsets, a PSFCH resource related to the PSSCH. In step S1450, the first device may perform the PSFCH transmission based on the PSFCH resource. For example, the PRB subsets may be determined by ordering in ascending order of PRB subset index and in ascending order of interlace index.

For example, the PRB subsets may be determined by ordering first in ascending order of the PRB subset index and second in ascending order of the interlace index.

For example, at least one PRB subset of the PRB subsets may be allocated to a resource for the PSSCH. For example, the PSFCH resource may be determined within the at least one PRB subset based on a source ID included in sidelink control information (SCI) on the PSSCH. For example, the PSFCH resource may be determined within the at least one PRB subset based on an ID of the first device and a source ID included in sidelink control information (SCI) on the PSSCH.

For example, PSFCH resources may be first indexed in ascending order of PRB subset index, second indexed in ascending order of RB set index, and then indexed in ascending order of cyclic shift pair index. For example, the PSFCH resources may be determined based on at least one PRB subset allocated to a resource for the PSSCH among the PRB subsets. For example, the PSFCH resource may be determined within the PSFCH resources based on a source ID included in sidelink control information (SCI) on the PSSCH. For example, the PSFCH resource may be determined within the PSFCH resources based on an ID of the first device and a source ID included in sidelink control information (SCI) on the PSSCH.

For example, the PSSCH may be related to a plurality of PSFCH occasions. For example, based on PSFCH transmission failure in all PSFCH occasions before a PSFCH occasion of the plurality of PSFCH occasions, PSFCH transmission may be attempted by the first device in the PSFCH occasion. For example, based on performing PSFCH transmission in a PSFCH occasion of the plurality of PSFCH occasions, the first device may not be allowed to attempt PSFCH transmission after the PSFCH occasion.

For example, PSFCH transmit power on a common PRB may be obtained regardless of a number of PSFCH transmissions.

The proposed method can be applied to devices based on various embodiments of the present disclosure. First, the processor 102 of the first device 100 may obtain information related to a resource block (RB) set for physical sidelink feedback channel (PSFCH) transmission. In addition, the processor 102 of the first device 100 may determine physical resource block (PRB) subsets based on the RB set. In addition, the processor 102 of the first device 100 may control the transceiver 106 to receive a physical sidelink shared channel (PSSCH) from a second device. In addition, the processor 102 of the first device 100 may determine, based on the PRB subsets, a PSFCH resource related to the PSSCH. In addition, the processor 102 of the first device 100 may control the transceiver 106 to perform the PSFCH transmission based on the PSFCH resource. For example, the PRB subsets may be determined by ordering in ascending order of PRB subset index and in ascending order of interlace index.

Based on an embodiment of the present disclosure, a first device adapted to perform wireless communication may be provided. For example, the first device may comprise: at least one transceiver; at least one processor; and at least one memory connected to the at least one processor and storing instructions. For example, the instructions, based on being executed by the at least one processor, may cause the first device to perform operations comprising: obtaining information related to a resource block (RB) set for physical sidelink feedback channel (PSFCH) transmission; determining physical resource block (PRB) subsets based on the RB set; receiving a physical sidelink shared channel (PSSCH) from a second device; determining, based on the PRB subsets, a PSFCH resource related to the PSSCH; and performing the PSFCH transmission based on the PSFCH resource. For example, the PRB subsets may be determined by ordering in ascending order of PRB subset index and in ascending order of interlace index.

Based on an embodiment of the present disclosure, a processing device adapted to control a first device may be provided. For example, the processing device may comprise: at least one processor; and at least one memory connected to the at least one processor and storing instructions. For example, the instructions, based on being executed by the at least one processor, may cause the first device to perform operations comprising: obtaining information related to a resource block (RB) set for physical sidelink feedback channel (PSFCH) transmission; determining physical resource block (PRB) subsets based on the RB set; receiving a physical sidelink shared channel (PSSCH) from a second device; determining, based on the PRB subsets, a PSFCH resource related to the PSSCH; and performing the PSFCH transmission based on the PSFCH resource. For example, the PRB subsets may be determined by ordering in ascending order of PRB subset index and in ascending order of interlace index.

Based on an embodiment of the present disclosure, anon-transitory computer-readable storage medium storing instructions may be provided. For example, the instructions, when executed, may cause a first device to perform operations comprising: obtaining information related to a resource block (RB) set for physical sidelink feedback channel (PSFCH) transmission; determining physical resource block (PRB) subsets based on the RB set; receiving a physical sidelink shared channel (PSSCH) from a second device; determining, based on the PRB subsets, a PSFCH resource related to the PSSCH; and performing the PSFCH transmission based on the PSFCH resource. For example, the PRB subsets may be determined by ordering in ascending order of PRB subset index and in ascending order of interlace index.

Figure 15:
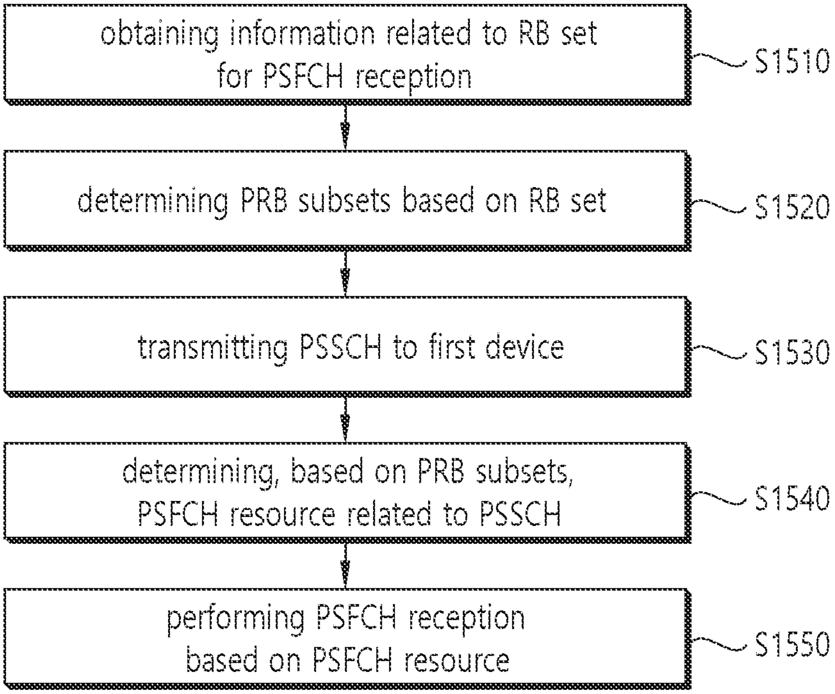
FIG. 15 shows a method for a second device to perform wireless communication, based on an embodiment of the present disclosure.

FIG. 15 shows a method for a second device to perform wireless communication, based on an embodiment of the present disclosure. The embodiment of FIG. 15 may be combined with various embodiments of the present disclosure.

Referring to FIG. 15, in step S1510, the second device may obtain information related to a resource block (RB) set for physical sidelink feedback channel (PSFCH) reception. In step S1520, the second device may determine physical resource block (PRB) subsets based on the RB set. In step S1530, the second device may transmit a physical sidelink shared channel (PSSCH) to a first device. In step S1540, the second device may determine, based on the PRB subsets, a PSFCH resource related to the PSSCH. In step S1550, the second device may perform the PSFCH reception based on the PSFCH resource. For example, the PRB subsets may be determined by ordering in ascending order of PRB subset index and in ascending order of interlace index.

For example, the PRB subsets may be determined by ordering first in ascending order of the PRB subset index and second in ascending order of the interlace index.

For example, at least one PRB subset of the PRB subsets may be allocated to a resource for the PSSCH. For example, the PSFCH resource may be determined within the at least one PRB subset based on a source ID included in sidelink control information (SCI) on the PSSCH. For example, the PSFCH resource may be determined within the at least one PRB subset based on an ID of the first device and a source ID included in sidelink control information (SCI) on the PSSCH.

For example, PSFCH resources may be first indexed in ascending order of PRB subset index, second indexed in ascending order of RB set index, and then indexed in ascending order of cyclic shift pair index. For example, the PSFCH resources may be determined based on at least one PRB subset allocated to a resource for the PSSCH among the PRB subsets. For example, the PSFCH resource may be determined within the PSFCH resources based on a source ID included in sidelink control information (SCI) on the PSSCH. For example, the PSFCH resource may be determined within the PSFCH resources based on an ID of the first device and a source ID included in sidelink control information (SCI) on the PSSCH.

For example, the PSSCH may be related to a plurality of PSFCH occasions. For example, based on PSFCH transmission failure in all PSFCH occasions before a PSFCH occasion of the plurality of PSFCH occasions, PSFCH transmission may be attempted by the first device in the PSFCH occasion. For example, based on performing PSFCH transmission in a PSFCH occasion of the plurality of PSFCH occasions, the first device may not be allowed to attempt PSFCH transmission after the PSFCH occasion.

For example, PSFCH transmit power on a common PRB may be obtained regardless of a number of PSFCH transmissions.

The proposed method can be applied to devices based on various embodiments of the present disclosure. First, the processor 202 of the second device 200 may obtain information related to a resource block (RB) set for physical sidelink feedback channel (PSFCH) reception. In addition, the processor 202 of the second device 200 may determine physical resource block (PRB) subsets based on the RB set. In addition, the processor 202 of the second device 200 may control the transceiver 206 to transmit a physical sidelink shared channel (PSSCH) to a first device. In addition, the processor 202 of the second device 200 may determine, based on the PRB subsets, a PSFCH resource related to the PSSCH. In addition, the processor 202 of the second device 200 may control the transceiver 206 to perform the PSFCH reception based on the PSFCH resource. For example, the PRB subsets may be determined by ordering in ascending order of PRB subset index and in ascending order of interlace index.

Based on an embodiment of the present disclosure, a second device adapted to perform wireless communication may be provided. For example, the second device may comprise: at least one transceiver; at least one processor; and at least one memory connected to the at least one processor and storing instructions. For example, the instructions, based on being executed by the at least one processor, may cause the second device to perform operations comprising: obtaining information related to a resource block (RB) set for physical sidelink feedback channel (PSFCH) reception; determining physical resource block (PRB) subsets based on the RB set; transmitting a physical sidelink shared channel (PSSCH) to a first device; determining, based on the PRB subsets, a PSFCH resource related to the PSSCH; and performing the PSFCH reception based on the PSFCH resource. For example, the PRB subsets may be determined by ordering in ascending order of PRB subset index and in ascending order of interlace index.

Based on an embodiment of the present disclosure, a processing device adapted to control a second device may be provided. For example, the processing device may comprise: at least one processor; and at least one memory connected to the at least one processor and storing instructions. For example, the instructions, based on being executed by the at least one processor, may cause the second device to perform operations comprising: obtaining information related to a resource block (RB) set for physical sidelink feedback channel (PSFCH) reception; determining physical resource block (PRB) subsets based on the RB set; transmitting a physical sidelink shared channel (PSSCH) to a first device; determining, based on the PRB subsets, a PSFCH resource related to the PSSCH; and performing the PSFCH reception based on the PSFCH resource. For example, the PRB subsets may be determined by ordering in ascending order of PRB subset index and in ascending order of interlace index.

Based on an embodiment of the present disclosure, anon-transitory computer-readable storage medium storing instructions may be provided. For example, the instructions, when executed, may cause a second device to perform operations comprising: obtaining information related to a resource block (RB) set for physical sidelink feedback channel (PSFCH) reception; determining physical resource block (PRB) subsets based on the RB set; transmitting a physical sidelink shared channel (PSSCH) to a first device; determining, based on the PRB subsets, a PSFCH resource related to the PSSCH; and performing the PSFCH reception based on the PSFCH resource. For example, the PRB subsets may be determined by ordering in ascending order of PRB subset index and in ascending order of interlace index.

Based on various embodiments of the present disclosure, the PSFCH resource with the interlace structure may be efficiently selected from the PSSCH resource with the interlace structure. For example, since a device that has transmitted the PSSCH with the interlace structure can determine the PSFCH resource with the interlace structure based on the indexing proposed in various embodiments of the present disclosure, the device can perform PSFCH monitoring/receiving for the PSSCH. Similarly, since a device that has received the PSSCH with the interlace structure can determine the PSFCH resource with the interlace structure based on the indexing proposed in various embodiments of the present disclosure, the device can perform PSFCH transmission for the PSSCH. Through this, the reliability of sidelink communication in the unlicensed band can be ensured.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
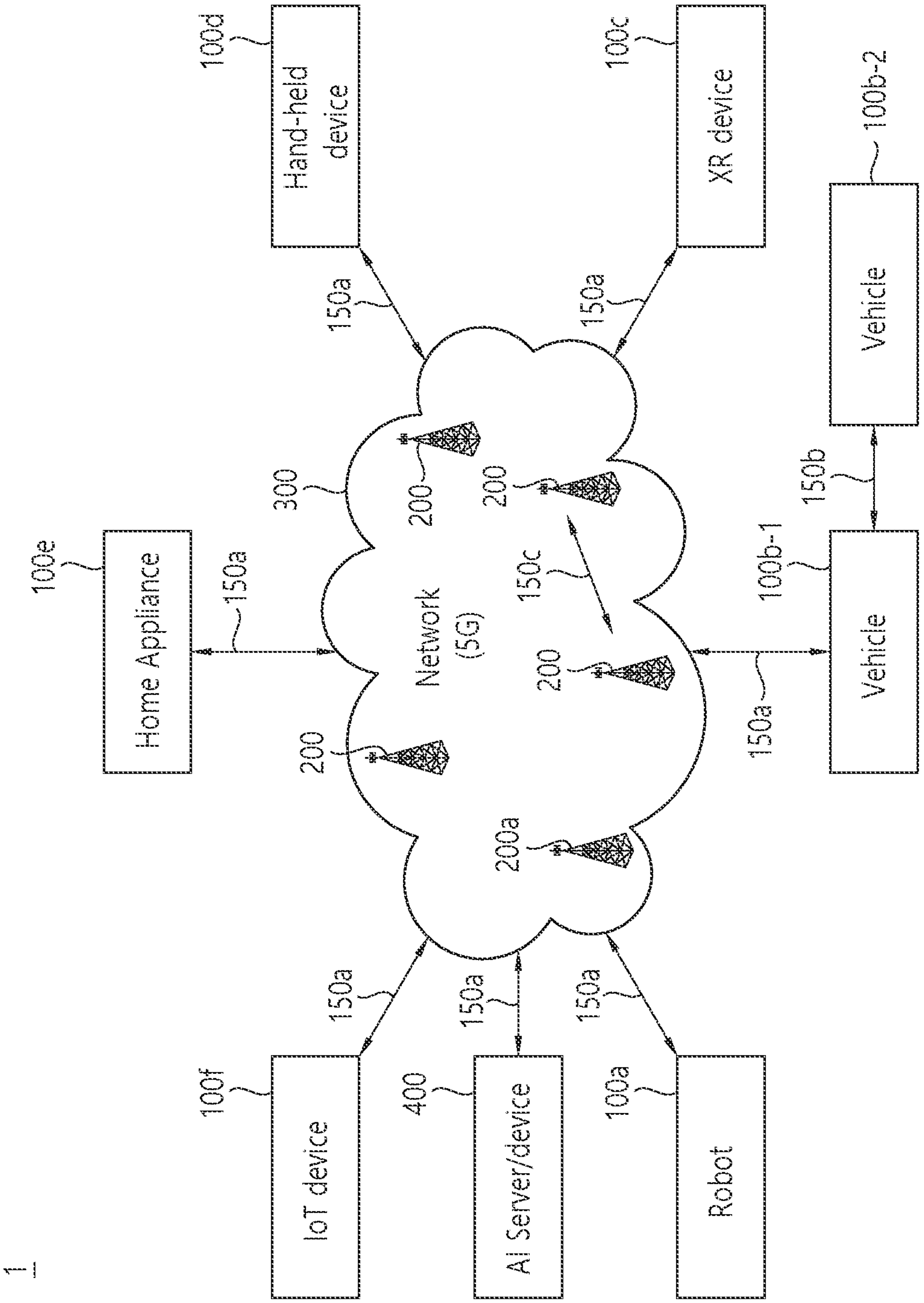
FIG. 16 shows a communication system 1, based on an embodiment of the present disclosure.

FIG. 16 shows a communication system 1, based on an embodiment of the present disclosure. The embodiment of FIG. 16 may be combined with various embodiments of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone) and/or an Aerial Vehicle (AV) (e.g., Advanced Air Mobility (AAM)). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
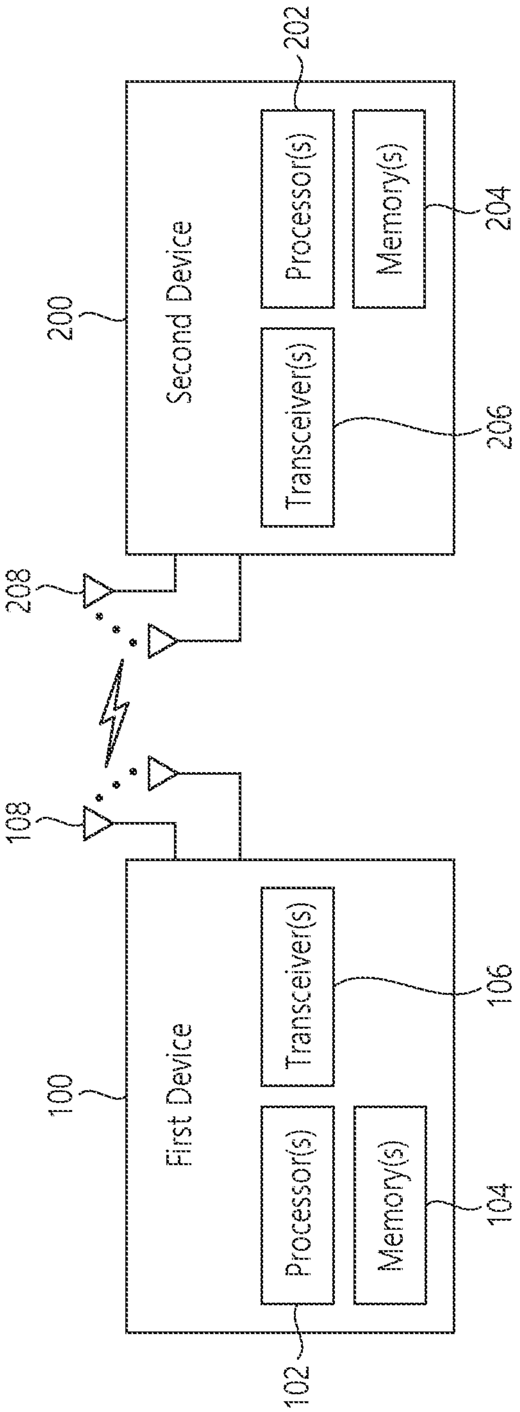
FIG. 17 shows wireless devices, based on an embodiment of the present disclosure.

FIG. 17 shows wireless devices, based on an embodiment of the present disclosure. The embodiment of FIG. 17 may be combined with various embodiments of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
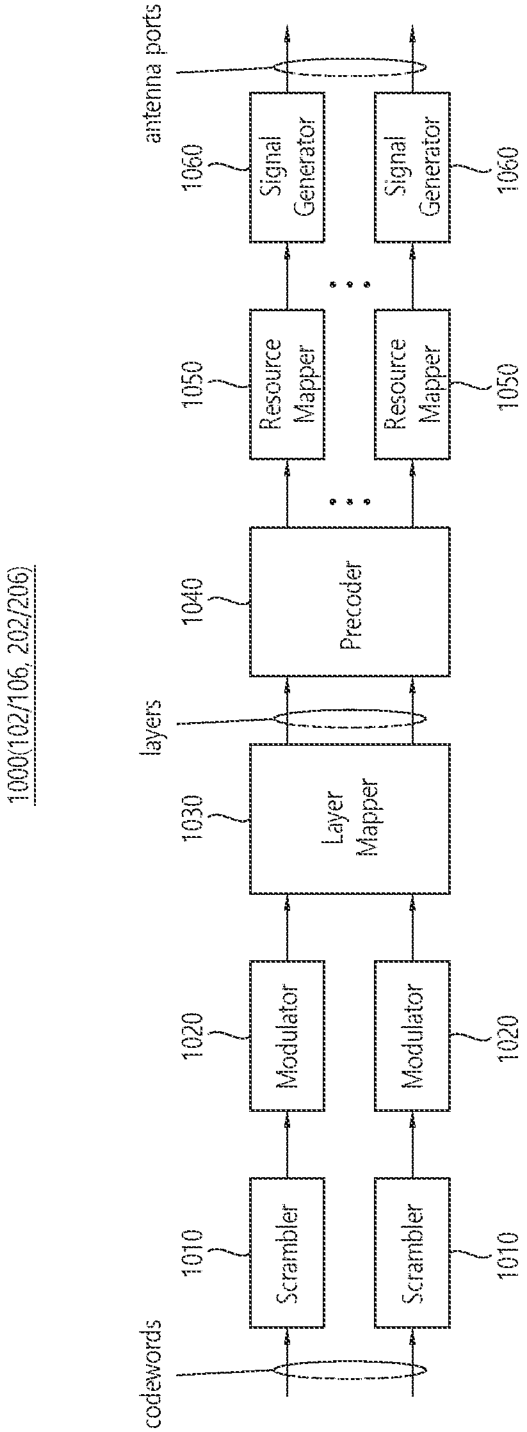
FIG. 18 shows a signal process circuit for a transmission signal, based on an embodiment of the present disclosure.

FIG. 18 shows a signal process circuit for a transmission signal, based on an embodiment of the present disclosure. The embodiment of FIG. 18 may be combined with various embodiments of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device.

The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
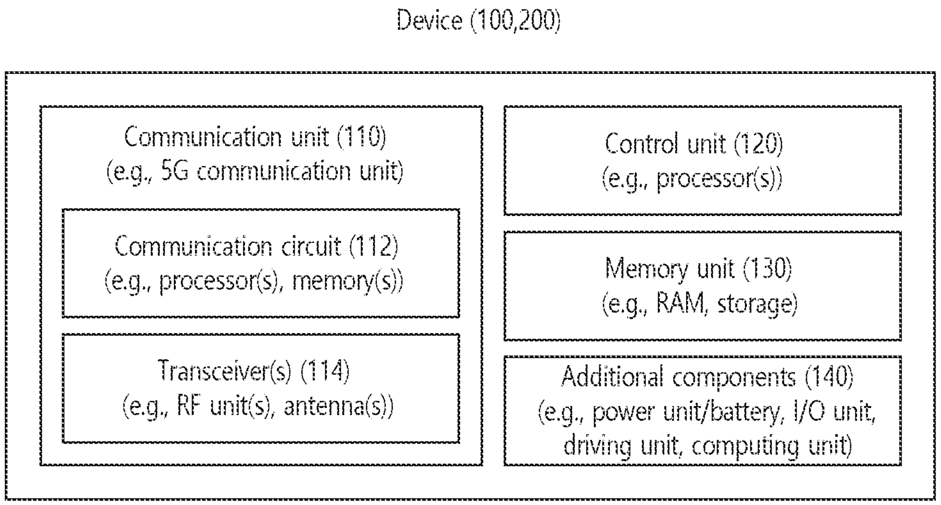
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16). The embodiment of FIG. 19 may be combined with various embodiments of the present disclosure.

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
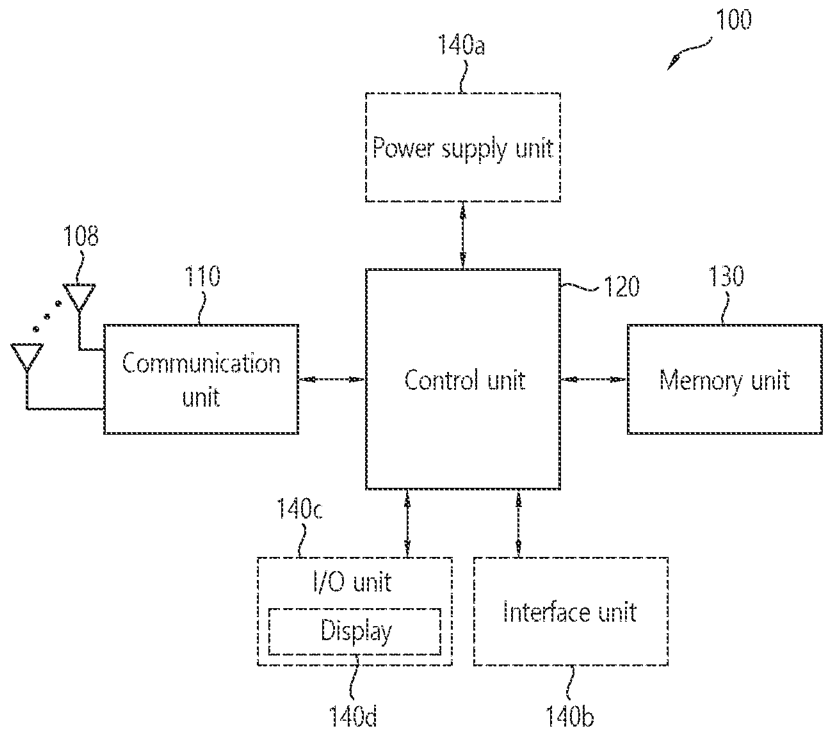
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 20 may be combined with various embodiments of the present disclosure.

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 21:
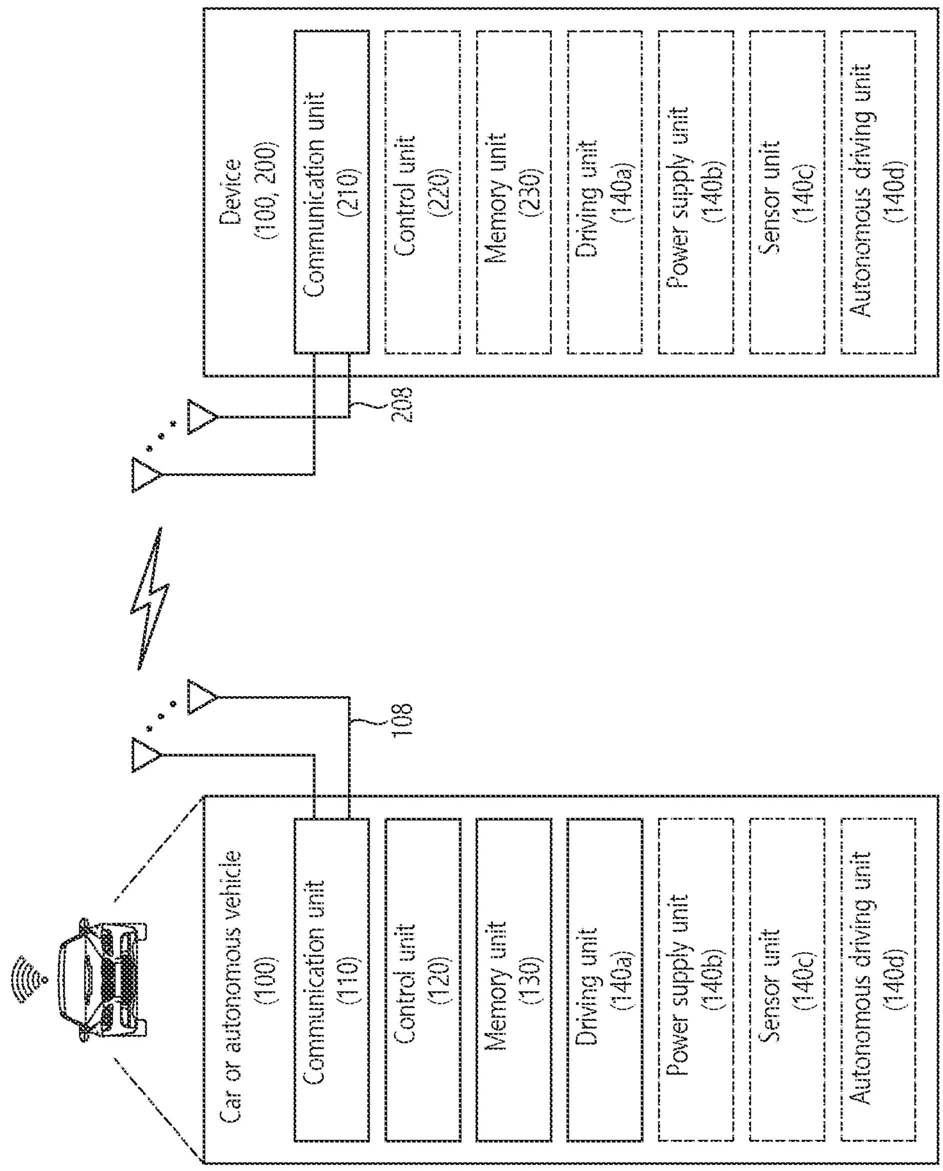
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 21 may be combined with various embodiments of the present disclosure.

Referring to FIG. 21, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

obtaining, by a first device, information related to a resource block (RB) set for physical sidelink feedback channel (PSFCH) transmission;

determining, by the first device, physical resource block (PRB) subsets based on the RB set;

receiving, by the first device, a physical sidelink shared channel (PSSCH) from a second device;

determining, by the first device, based on the PRB subsets, a PSFCH resource related to the PSSCH; and performing, by the first device, the PSFCH transmission based on the PSFCH resource, wherein the PRB subsets are determined by ordering first in ascending order of PRB subset index and second in ascending order of interlace index.

2. The method of claim 1, wherein at least one PRB subset of the PRB subsets is allocated to a resource for the PSSCH.

3. The method of claim 2, wherein the PSFCH resource is determined within the at least one PRB subset based on a source ID included in sidelink control information (SCI) on the PSSCH.

4. The method of claim 2, wherein the PSFCH resource is determined within the at least one PRB subset based on an ID of the first device and a source ID included in sidelink control information (SCI) on the PSSCH.

5. The method of claim 1, wherein PSFCH resources are first indexed in ascending order of PRB subset index, second indexed in ascending order of RB set index, and then indexed in ascending order of cyclic shift pair index.

6. The method of claim 5, wherein the PSFCH resources are determined based on at least one PRB subset allocated to a resource for the PSSCH among the PRB subsets.

7. The method of claim 5, wherein the PSFCH resource is determined within the PSFCH resources based on a source ID included in sidelink control information (SCI) on the PSSCH.

8. The method of claim 5, wherein the PSFCH resource is determined within the PSFCH resources based on an ID of the first device and a source ID included in sidelink control information (SCI) on the PSSCH.

9. The method of claim 1, wherein the PSSCH is related to a plurality of PSFCH occasions.

10. The method of claim 9, wherein, based on PSFCH transmission failure in all PSFCH occasions before a PSFCH occasion of the plurality of PSFCH occasions, PSFCH transmission is attempted by the first device in the PSFCH occasion.

11. The method of claim 9, wherein, based on performing PSFCH transmission in a PSFCH occasion of the plurality of PSFCH occasions, the first device is not allowed to attempt PSFCH transmission after the PSFCH occasion.

12. The method of claim 1, wherein PSFCH transmit power on a common PRB is obtained regardless of a number of PSFCH transmissions.

13. A first device comprising:

at least one transceiver;

at least one processor; and at least one memory connected to the at least one processor and storing instructions that, based on being executed by the at least one processor, cause the first device to perform operations comprising:

obtaining information related to a resource block (RB) set for physical sidelink feedback channel (PSFCH) transmission;

determining physical resource block (PRB) subsets based on the RB set;

receiving a physical sidelink shared channel (PSSCH) from a second device;

determining, based on the PRB subsets, a PSFCH resource related to the PSSCH; and performing the PSFCH transmission based on the PSFCH resource, wherein the PRB subsets are determined by ordering first in ascending order of PRB subset index and second in ascending order of interlace index.

14. The first device of claim 13, wherein at least one PRB subset of the PRB subsets is allocated to a resource for the PSSCH.

15. The first device of claim 14, wherein the PSFCH resource is determined within the at least one PRB subset based on a source ID included in sidelink control information (SCI) on the PSSCH.

16. The first device of claim 14, wherein the PSFCH resource is determined within the at least one PRB subset based on an ID of the first device and a source ID included in sidelink control information (SCI) on the PSSCH.

17. A processing device comprising:

at least one processor; and at least one memory connected to the at least one processor and storing instructions that, based on being executed by the at least one processor, cause a first device to perform operations comprising:

obtaining information related to a resource block (RB) set for physical sidelink feedback channel (PSFCH) transmission;

determining physical resource block (PRB) subsets based on the RB set;

receiving a physical sidelink shared channel (PSSCH) from a second device;

determining, based on the PRB subsets, a PSFCH resource related to the PSSCH; and performing the PSFCH transmission based on the PSFCH resource, wherein the PRB subsets are determined by ordering first in ascending order of PRB subset index and second in ascending order of interlace index.

18. The processing device of claim 17, wherein at least one PRB subset of the PRB subsets is allocated to a resource for the PSSCH.

19. The processing device of claim 18, wherein the PSFCH resource is determined within the at least one PRB subset based on a source ID included in sidelink control information (SCI) on the PSSCH.

20. The processing device of claim 18, wherein the PSFCH resource is determined within the at least one PRB subset based on an ID of the first device and a source ID included in sidelink control information (SCI) on the PSSCH.

* * * * *